(12) United States Patent
Song et al.

(10) Patent No.: US 12,301,913 B2
(45) Date of Patent: May 13, 2025

(54) DISPLAY DEVICE AND DISPLAY DEVICE CONTROL METHOD

(71) Applicant: SAMSUNG ELECTRONICS CO., LTD., Suwon-si (KR)

(72) Inventors: Kihyun Song, Suwon-si (KR); Kwanyoung Kim, Suwon-si (KR); Minsup Kim, Suwon-si (KR); Sukhoon Yoon, Suwon-si (KR); Wonjae Lee, Suwon-si (KR); Jongkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/538,286

(22) Filed: Dec. 13, 2023

(65) Prior Publication Data

US 2024/0114194 A1 Apr. 4, 2024

Related U.S. Application Data

(63) Continuation of application No. PCT/KR2022/013852, filed on Sep. 16, 2022.

(30) Foreign Application Priority Data

Sep. 17, 2021 (KR) ........................ 10-2021-0124578

(51) Int. Cl.
*H04N 21/422* (2011.01)
*H04W 76/19* (2018.01)

(52) U.S. Cl.
CPC ...... *H04N 21/42204* (2013.01); *H04W 76/19* (2018.02)

(58) Field of Classification Search
None
See application file for complete search history.

(56) References Cited

U.S. PATENT DOCUMENTS

| | | |
|---|---|---|
| 9,106,337 B2 | 8/2015 | Jung et al. |
| 9,425,892 B2 | 8/2016 | Murayama et al. |
| 9,467,119 B2 | 10/2016 | Lee et al. |
| 9,992,439 B2 | 6/2018 | Lee et al. |
| 10,045,181 B2 | 8/2018 | Lee et al. |
| 10,327,211 B2 | 6/2019 | Lee |
| 11,533,766 B2 | 12/2022 | Song et al. |

(Continued)

FOREIGN PATENT DOCUMENTS

| | | |
|---|---|---|
| CN | 109345813 A | 2/2019 |
| JP | 6269497 | 1/2018 |

(Continued)

*Primary Examiner* — Samira Monshi
(74) *Attorney, Agent, or Firm* — STAAS & HALSEY LLP

(57) ABSTRACT

A display device comprises a display unit, a communication unit and a processor, which identifies, based on an IR signal received through the communication unit, whether there is a pairing history of a remote controller and the display device, identifies whether there is a Bluetooth connection between the display device and the remote controller, counts a number of times the Bluetooth connection had been cut off between the display device and the remote controller, and controls, based on the counted number of times the Bluetooth connection had been cut off, the display unit so that a user interface (UI) for pairing with the remote controller is displayed.

20 Claims, 18 Drawing Sheets

(56) References Cited

U.S. PATENT DOCUMENTS

| | | | | |
|---|---|---|---|---|
| 2016/0127673 A1* | 5/2016 | Lee | ............... | H04N 21/42204 |
| | | | | 348/734 |
| 2021/0251028 A1* | 8/2021 | Song | ............... | H04W 4/80 |
| 2021/0266391 A1* | 8/2021 | Kozai | ............... | F24H 9/0005 |
| 2024/0292048 A1* | 8/2024 | Yu | ............... | G08C 17/02 |

FOREIGN PATENT DOCUMENTS

| | | |
|---|---|---|
| KR | 10-2016-0000310 | 1/2016 |
| KR | 10-2016-0050697 | 5/2016 |
| KR | 10-2016-0065886 | 6/2016 |
| KR | 10-2016-0138708 | 12/2016 |
| KR | 10-1851532 | 6/2018 |
| KR | 10-2020-0001768 | 1/2020 |
| KR | 10-2121836 | 6/2020 |
| KR | 10-2189648 | 12/2020 |
| KR | 10-2021-0027920 | 3/2021 |
| WO | WO 2016/002302 A1 | 1/2016 |
| WO | WO 2020/004765 A1 | 1/2020 |

\* cited by examiner

DISPLAY DEVICE AND DISPLAY DEVICE CONTROL METHOD

CROSS-REFERENCE TO RELATED APPLICATIONS

This is a continuation application of International Application PCT/KR2022/013852, filed Sep. 16, 2022, which is incorporated herein by reference in its entirety, it being further noted that foreign priority benefit is based upon Korean Patent Application No. 10-2021-0124578, filed Sep. 17, 2021, the disclosures of which are incorporated by reference herein in their entirety.

TECHNICAL FIELD

The disclosure relates to a display device and a control method of the display device, and more particularly, to a display device that can detect a Bluetooth connection between a display device and a Bluetooth remote controller, and display a UI related to the Bluetooth connection, and a control method thereof.

DESCRIPTION OF THE RELATED ART

One of the devices that are used a lot for a user to remotely control a specific device is a remote controller. In particular, in the case of a display device such as a TV, a remote controller using infrared ray (IR) communication has been used a lot.

Recently, along with commercialization of smart TVs, use of a remote controller using Bluetooth communication is gradually increasing, departing from conventional IR communication. A remote controller based on Bluetooth communication is superior to a remote controller by the conventional IR method in the aspect of power consumption, and also, it enables control of a display device in a long distance. Not only that, a remote controller based on Bluetooth communication transmits a signal including more information than a remote controller by the IR method, and can thus control a display device in various ways.

In the case of a Bluetooth remote controller, a frequency between a display device which is a master device and the Bluetooth remote controller which is a slave device is needed, unlike in the IR method. More specifically, if the slave device cannot be synchronized with frequency hopping generated by the master device, Bluetooth communication between the two devices fails. In particular, in case synchronization between the two devices fails by electric wave interference by a peripheral device, control of the display device using the Bluetooth remote controller is impossible. Accordingly, most Bluetooth remote controllers additionally include a control function based on IR communication.

However, in this case, a situation wherein a user does not recognize a cut-off of Bluetooth communication even though the Bluetooth communication has been cut off, and controls the display device based on IR communication occurs. The user cannot fully enjoy advantages of a Bluetooth remote controller such as reduction of power consumption and remote control in a relatively long distance explained above, and still utilizes a control function based on IR communication even though the user is using a Bluetooth remote controller. Accordingly, there is a demand for a display device or a method for notifying a user who does not recognize a cut-off of a Bluetooth connection even though the Bluetooth connection has been cut off about such a situation.

DETAILED DESCRIPTION OF THE INVENTION

Technical Task

The task to be resolved in the disclosure is providing a display device that can monitor a Bluetooth connection between the display device and a Bluetooth remote controller in real time, and if the Bluetooth connection fails, provide information about it to a user, and a control method of the display device.

However, the task to be resolved in the disclosure is not limited to the task described above, and there may be other tasks.

Technical Solution

According to an embodiment of the disclosure, a display device may comprise a display unit, a communication unit, and a processor configured to receive an InfraRed (IR) signal from a remote controller through the communication unit, the IR signal including identification information of the display device identify whether there is a pairing history of a pairing the remote controller with the display device based on the identification information, based on the identifying that there is the pairing history, identify whether the pairing was made using a Bluetooth connection; and count a number of times that the pairing using the Bluetooth connection had been cut off based on the pairing history, and based on identifying that the pairing between the display device and the remote controller is required based on the counted number of times, control the display unit to display a user interface (UI) to pair with the remote controller.

The UI may comprise information to guide a user instruction that needs to be input into the remote controller to pair with the remote controller, and the processor may be further configured to: based on the counted number of times being greater than or equal to a predetermined number, control the display unit to display the UI for the pairing with the remote controller.

The processor may be configured to: acquire a first identification value generated by the remote controller based on the pairing history; generate a second identification value based on the identification information of the display device; and identify whether the first identification value and the second identification value coincide to identify the pairing history of the pairing between the display device and the remote controller.

The processor may be configured to: periodically identify whether there is the Bluetooth connection between the display device and the remote controller; and based on the identifying that there is the Bluetooth connection between the display device and the remote controller, initialize the counted number of times.

The UI may further comprise: information indicating that pairing with the remote controller is being performed, and the processor is further configured to: based on the identifying that the pairing connection between the display device and the remote controller had been cut off based on the counted number of times, transmit an IR signal to request a pairing connection with the display device to the remote controller through the communication unit.

The processor may be configured to: based on the identifying that the first identification value and the second identification value do not coincide, transmit an IR signal to request a pairing connection with the display device to the remote controller; and control the display unit to display a UI including information indicating that pairing with the remote controller is being performed.

The remote controller may be configured to: identify whether there is the display device having the pairing history with the remote controller; and based on the identifying that there is the display device having the pairing history with the remote controller, identify whether there is the Bluetooth connection with the display device, and based on the identifying that the Bluetooth connection with the display device had been cut off, generate the first identification value, and transmit the IR signal including the first identification value and a control signal corresponding to a control instruction input into the remote controller to the display device.

The processor may be configured to: identify whether the remote controller has the pairing history with the display device based on the first identification value; and control an operation of the display device based on the control signal.

According an embodiment of the disclosure, a control method of a display device, the method may comprise: receiving an IR signal including identification information of the display device, from a remote controller; identifying whether there is a pairing history of a pairing of the remote controller with the display device based on the identification information of the display device; based on the identifying that there is the pairing history of the pairing of the remote controller and the display device, identifying whether is the pairing was made using a Bluetooth connection; counting a number of times that the Bluetooth connection between the display device and the remote controller had been cut off based on the pairing history; and based on the identifying that the pairing between the display device and the remote controller is required based on the counted number of times that the Bluetooth connection has been cut off, displaying a user interface (UI) to pair with the remote controller.

The UI may further comprise: information to guide a user instruction that needs to be input into the remote controller to pair with the remote controller, and the displaying the UI comprises: based on the counted number of times being greater than or equal to a predetermined number, displaying the UI for a pairing with the remote controller.

The identifying whether there is the pairing history of being paired may comprise: acquiring a first identification value generated based on the identified pairing history; generating a second identification value based on the identification information of the display device; and identifying whether the first identification value and the second identification value coincide to identify the pairing history of the pairing between the display device and the remote controller.

The identifying whether there is the Bluetooth connection may comprise: periodically identifying whether there is the Bluetooth connection between the display device and the remote controller; and based on the identifying that there is the Bluetooth connection between the display device and the remote controller, initializing the counted number of times.

The UI may further comprise: information indicating that pairing with the remote controller is being performed, and the control method further comprises: based on the identifying that the pairing connection between the display device and the remote controller had been cut off based on the counted number of times that the Bluetooth connection had been cut off, transmitting an IR signal to request a pairing connection with the display device to the remote controller.

The method may further comprise based on the identifying that the first identification value and the second identification value do not coincide, transmitting the IR signal to request a pairing connection with the display device to the remote controller; and displaying the UI comprising information indicating that pairing with the remote controller is being performed.

The remote controller is configured to: identify whether there is the display device having the pairing history; and based on the identifying that there is the display device having the pairing history of the pairing with the remote controller, identify whether there is the Bluetooth connection with the display device, and based on the identifying that the Bluetooth connection with the display device had been cut off, generate the first identification value, and transmit the IR signal including the first identification value and a control signal corresponding to a control instruction input into the remote controller to the display device. According to an embodiment of the disclosure, in the step of identifying whether there is a history of being paired with the display device, it is identified whether the remote controller has a history of being paired with the display device based on the first identification value, and an operation of the display device is controlled based on the control signal.

Other specific matters of the disclosure are included in the detailed description and the drawings.

Effect of the Invention

According to the disclosure described above, a user who does not recognize a cut-off of a Bluetooth connection even though the Bluetooth connection has been cut off is provided with information on the Bluetooth connection, and the user may thereby be induced to attempt a Bluetooth connection between a remote controller and a display device. Through this, the user can enjoy the effects exerted through a Bluetooth remote controller such as reduction of power consumption and remote control in a long distance.

Also, a temporary cut-off of a Bluetooth connection and a cut-off of a Bluetooth connection requiring a paring are distinguished, and accordingly, unnecessary provision of information regarding a Bluetooth connection can be prevented.

In addition, a display device is controlled in response to a control instruction of the display device input by the user, and a cut-off of a Bluetooth connection is identified at the same time, and accordingly, the user's control of the display device is not interfered, and at the same time, it is monitored in real time whether there is a Bluetooth connection.

MODE FOR IMPLEMENTING THE INVENTION

Figure 1:
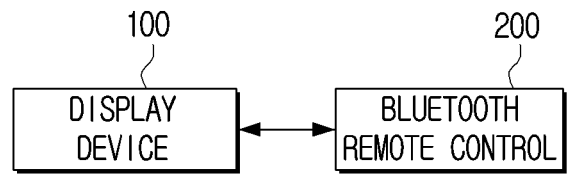
FIG. 1 is a configuration diagram of a system monitoring a Bluetooth connection between a display device and a remote controller according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of related known functions or components may unnecessarily confuse the gist of the disclosure, the detailed explanation in that regard will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used just to explain specific embodiments, and are not intended to limit the scope of the disclosure. In addition, singular expressions include plural expressions, unless defined obviously differently in the context.

Also, in the disclosure, expressions such as "have," "may have," "include," and "may include" denote the existence of such characteristics (e.g.: elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, 'a module' or 'a unit' may perform at least one function or operation, and may be implemented as hardware or software, or as a combination of hardware and software. Also, a plurality of 'modules' or 'units' may be integrated into at least one module and implemented as at least one processor, excluding 'a module' or 'a unit' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, such that those having ordinary skill in the art to which the disclosure belongs can easily carry out the disclosure.

FIG. 1 is a configuration diagram of a system monitoring a Bluetooth connection between a display device and a remote controller according to an embodiment of the disclosure.

Referring to FIG. 1, a system 1000 monitoring a Bluetooth connection between a display device and a remote controller includes a display device 100 and a remote controller 200.

In this specification, the display device 100 means an electronic device which includes a display unit, and can be controlled by a remote controller. For example, the display device 100 may include devices which can reproduce image contents as they include displays, and are set such that interlocking with a remote controller (referred to as a remote control hereinafter) is possible, such as a smart TV, a tablet, a desktop computer, a laptop computer, a smartphone, an air conditioner, an air purifier, a speaker, etc.

The remote control 200 means a remote controller that can transmit a control instruction to the display device 100 by a Bluetooth method and an infrared ray (IR) method.

Hereinafter, the display device 100 will be described in more detail with reference to FIG. 2, and the remote control 200 will be described in more detail with reference to FIG. 3.

Figure 2:
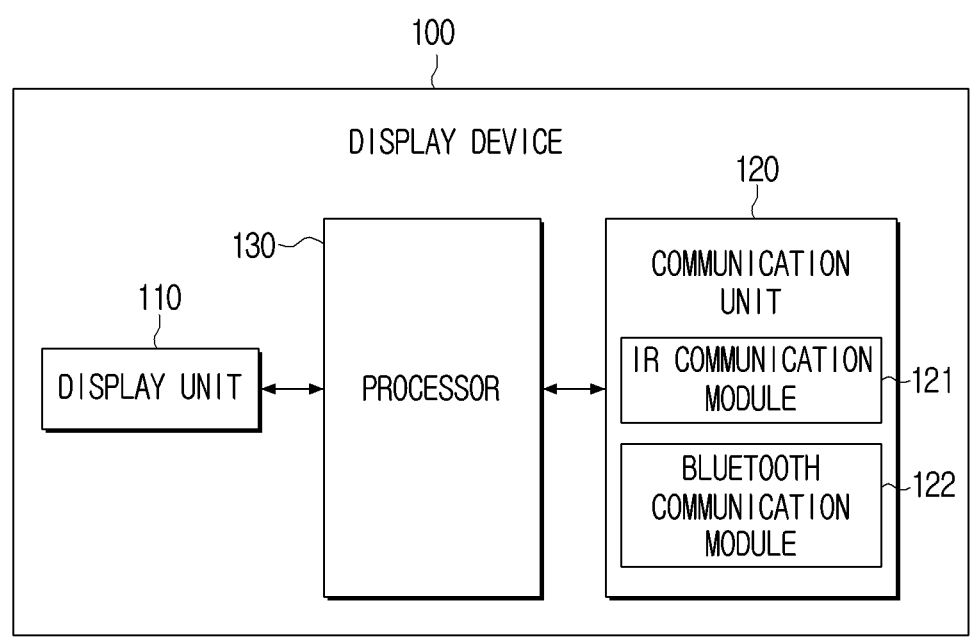
FIG. 2 is a schematic configuration diagram of a display device according to an embodiment of the disclosure.

FIG. 2 is a schematic configuration diagram of a display device according to an embodiment of the disclosure.

Referring to FIG. 2, the display device 100 includes a display unit 110, a communication unit 120, and a processor 130.

The display unit 110 may display various screens. For example, the display unit 110 displays a specific content, or displays a user interface (UI) guiding specific information. For this, the display unit 110 may be implemented as displays in various types such as an LCD, OLED, etc.

The communication unit 120 enables information between the display device 100 and an external device to be transmitted and received through communication methods in various forms. Specifically, the communication unit 120 includes an IR communication module 121 and a Bluetooth communication module 122.

The IR communication module 121 may perform communication with a remote controller (referred to as a remote control hereinafter). For this, the IR communication module 121 may include a module for receiving an IR signal from the remote control, and transmitting an IR signal to the remote control, etc.

The Bluetooth communication module 122 may perform communication with an external device by using a Bluetooth communication method. For this, as an example, the Bluetooth communication module 122 may perform Bluetooth communication with the remote control based on a basic rate (BR) method, an enhanced data rate (EDR) method, a high speed (HS) method, and a low energy (LE) method, etc.

Through this, a control signal controlling an operation of the display device 100 may be received from the remote control interlocked with the display device 100.

Meanwhile, although not illustrated clearly in the drawings, the communication unit 120 may further include a wireless communication module (e.g., Wi-Fi, 3GPP, Wi-Max, Long Term Evolution (LTE), 5G, etc.) other than the IR communication module 121 and the Bluetooth communication module 122.

The processor 130 controls the overall operations of the display device 100. Particularly, if information corresponding to an instruction controlling an operation of the display device 100 is input from an external server or an external device through the communication unit 110, the processor 130 controls the operation of the display device 100 based on the information. For example, the feature of controlling an operation of the display device 100, or a component included in the display device 100 based on a signal received from the remote controller (referred to as the remote control hereinafter) set to be interlocked with the display device 100 falls under this.

Figure 3:
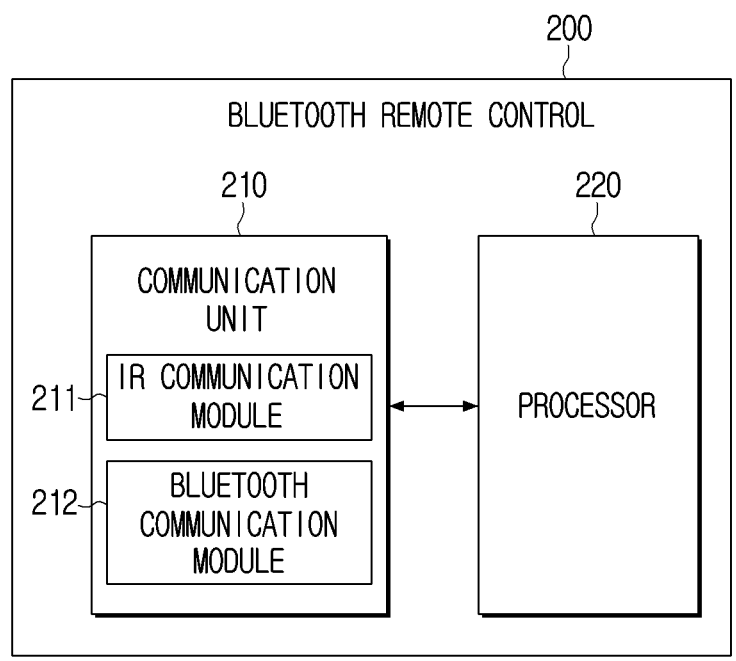
FIG. 3 is a schematic configuration diagram of a remote controller according to an embodiment of the disclosure.
Figure 4:
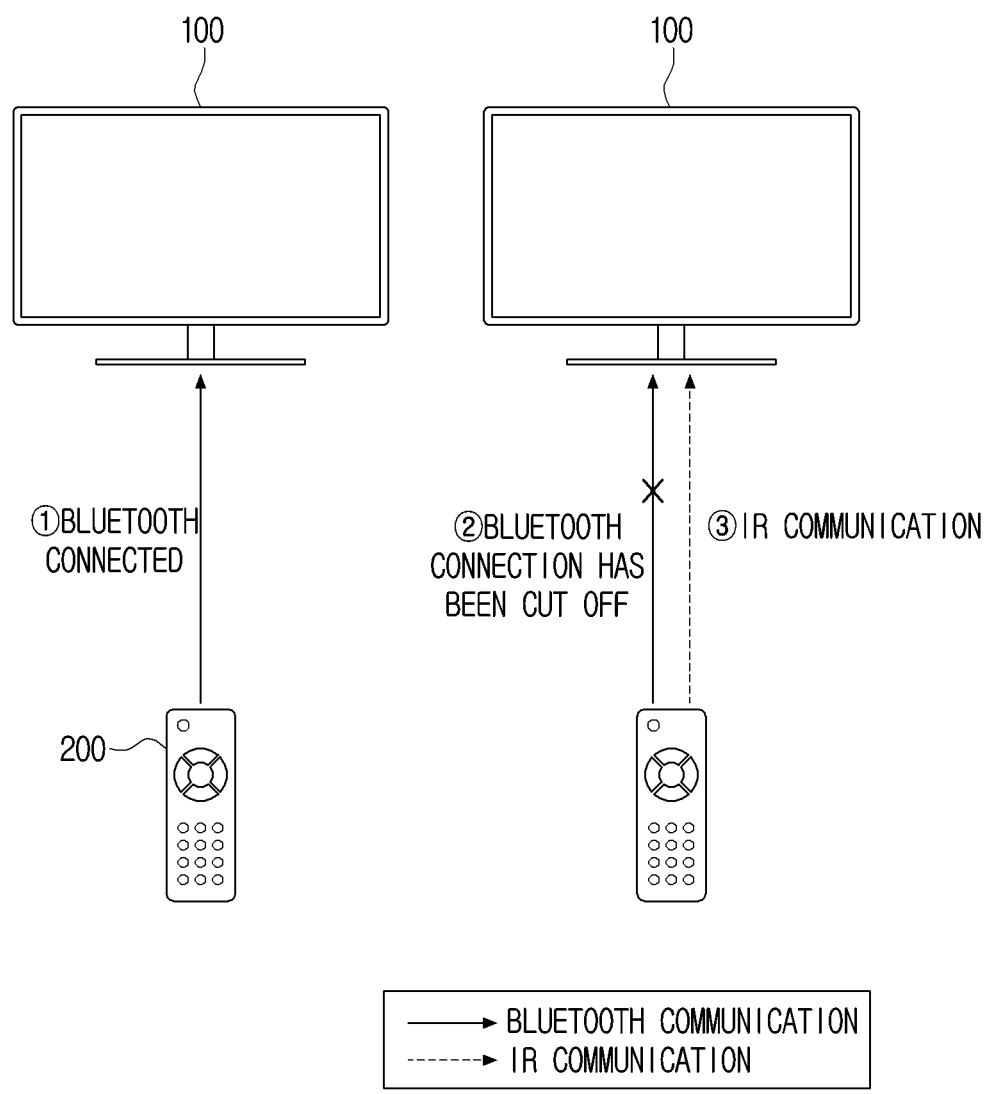
FIG. 4 is an exemplary diagram illustrating an operation method of a remote controller.

FIG. 3 is a schematic configuration diagram of a remote controller according to an embodiment of the disclosure. FIG. 4 is an exemplary diagram illustrating an operation method of a remote controller.

Referring to FIG. 3, the remote control 200 includes a communication unit 210 and a processor 220.

The communication unit 210 of the remote control 200 includes an IR communication module 211 and a Bluetooth communication module 212. The remote control 200 converts a control instruction corresponding to a user instruction input through an input interface (not shown) to an IR signal, and transmits the signal to the display device 100 according to the specification of the Infrared Data Association (IrDA) through the infrared ray (IR) communication module 211. Then, the remote control 200 transmits the control instruction to the display device 100 based on the basic rate (BR) method, the enhanced data rate (EDR) method, the high speed (HS) method, and the low energy (LE) method, etc. through the Bluetooth communication module 212.

The processor 220 controls the overall operations of the remote control 200. Specifically, if a control instruction is input through the input interface (not shown) of the remote control 200, the processor 220 transmits a signal including the control instruction to the display device 100 through the communication unit 210. In particular, the processor 220 detects whether there is a Bluetooth connection between the remote control 200 and the display device 100, and if it is identified that the Bluetooth connection has been cut off, transmits an IR signal regarding the control instruction through the IR communication module 211. That is, the remote control 200 firstly communicates with the display device 100 through Bluetooth communication, and in case Bluetooth communication is impossible, secondly communicates with the display device 100 through IR communication. However, the disclosure is not limited thereto, and the order of each communication method may be changed according to the setting by the user.

More specifically, referring to FIG. 4, the processor 220 of the remote control 200 detects whether there is a Bluetooth connection between the remote control 200 and the display device 100 through the communication unit 210, as described above. In case the Bluetooth connection is valid, the processor 220 transmits the control instruction input through the input interface (not shown) of the remote control 200 to the display device 100 through Bluetooth communication. However, in case the processor 220 identifies that the Bluetooth communication between the remote control 200 and the display device 100 has been cut off, the processor 220 transmits the control instruction input through the input interface (not shown) of the remote control 200 to the display device 100 through IR communication. Like this, the processor 220 identifies whether the Bluetooth connection between the remote control 200 and the display device has been cut off whenever a control instruction is input by the user or in real time.

Meanwhile, although not illustrated clearly in the drawings, the remote control 200 includes an input interface (not shown). For example, a plurality of buttons (not shown) that were set to correspond to each control instruction may be included while being arranged on one side of the remote control 200. Alternatively, the user's voice instruction may be received through a microphone (not shown).

Figure 5:
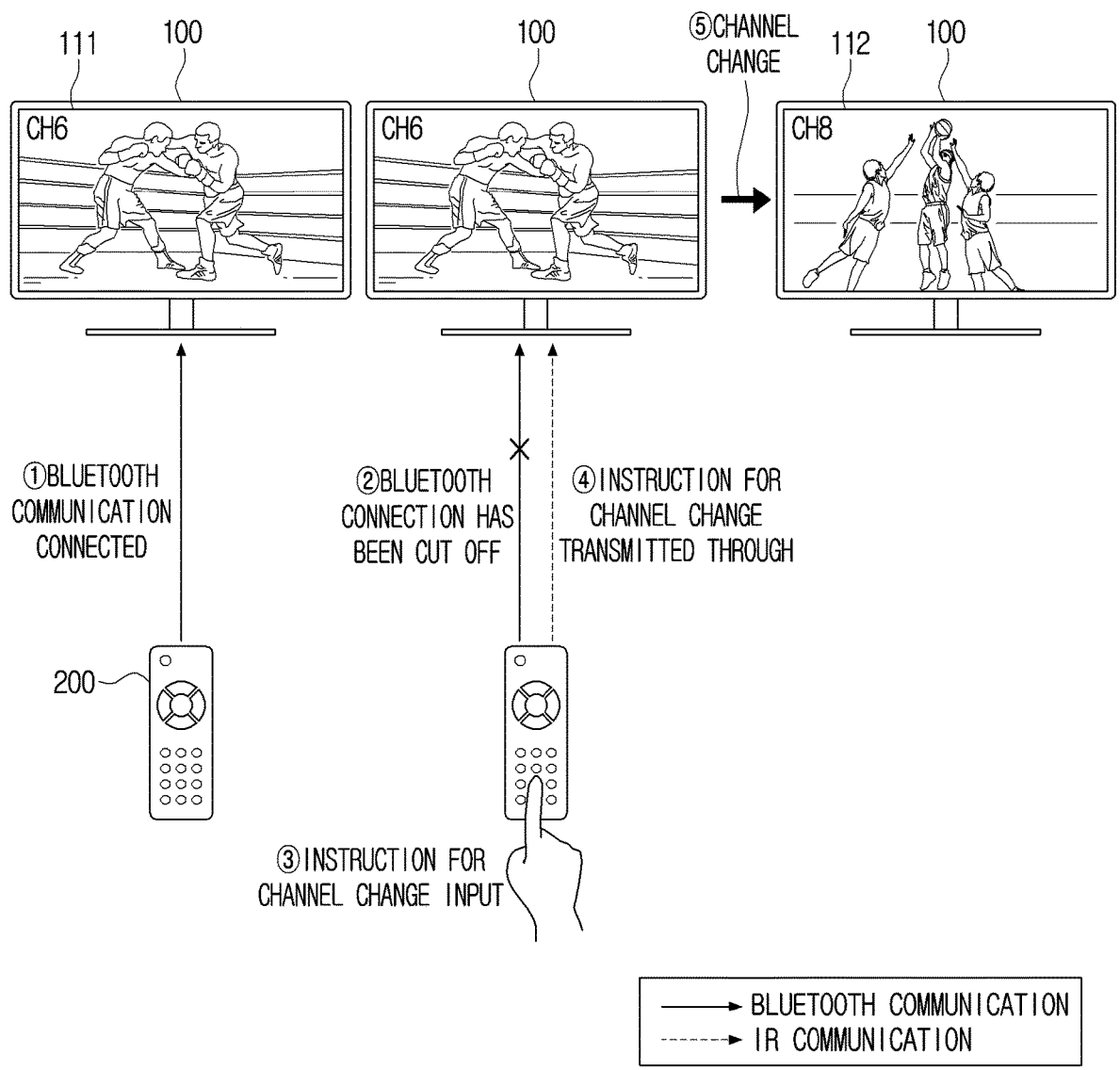
FIG. 5 is a diagram for illustrating that a user does not recognize a cut-off of a Bluetooth connection between a display device and a remote controller.

FIG. 5 is a diagram for illustrating that a user does not recognize a cut-off of a Bluetooth connection between a display device and a remote controller.

Referring to FIG. 5, when the Bluetooth connection with the display device 100 is cut off, the remote control 200 transmits a control instruction based on IR communication. That is, the user can control the display device 100 based on IR communication even though the Bluetooth connection has been cut off. Because of this, a situation wherein the user does not recognize a cut-off of the Bluetooth connection between the display device 100 and the remote control 200 is caused. This leads to a result that the user cannot fully enjoy the effects and advantages exerted by using the remote control 200 such as reduction of power consumption and long distance communication. For resolving such a problem, the disclosure induces a user to attempt a Bluetooth connection by providing information notifying that the Bluetooth connection has been cut off to a user using the remote control 200.

Hereinafter, with reference to FIG. 6 to FIG. 10, an embodiment of the disclosure wherein a Bluetooth connection between the display device 100 and the remote control 200 is monitored in real time, and a user interface (UI) enabling a user to recognize that the Bluetooth connection has been cut off based on the result related to the drawings will be described in detail.

First, for a Bluetooth connection between the display device 100 and the remote control 200, a pairing process should be performed in advance. A pairing process means a registration process between each device performing Bluetooth communication. Specifically, it means a process of generating bonding by exchanging profile information between each device and registering the information.

For example, the display device 100 and the remote control 200 exchange identification information of each device (e.g., the MAC address, etc.), and store the information in the memory (not shown) of each device. Also, it would be possible to set a password necessary for a Bluetooth connection. Meanwhile, after such a pairing process is performed, the display device 100 and the remote control 200 can have a Bluetooth connection automatically without a separate pairing process.

Meanwhile, a pairing process of the remote control 200 may be performed limited to a case wherein buttons of a predetermined type and a predetermined number among the plurality of buttons (not shown) included in the remote control 200 are input by the user. However, the disclosure is not limited thereto, and if an external device including a Bluetooth communication module within a predetermined range is searched, the display device 100 pay request a pairing process to the device, and a pairing process may be performed afterwards.

According to an embodiment of the disclosure, the processor 130 identifies whether there is a Bluetooth connection between the display device 100 and the remote control 200 based on a signal transmitted from the remote control 200. More specifically, in case the display device 100 received a signal including additional information that can identify the display device 100 from the remote control 200, but not a predetermined control instruction regarding the display device 100, the processor 130 identifies whether there is a Bluetooth connection between the display device 100 and the remote control 200. Hereinafter, a method of generating a signal performing the role of a trigger that identifies whether there is a Bluetooth connection between the display device 100 and the remote control 200 will be explained in detail.

In the memory (not shown) of the remote control 200, information on instructions regarding the display device 100 is matched with an input interface (not shown) corresponding to each instruction and is stored. Such information on instructions may be stored in advance in the manufacturing process of the remote control 200. Alternatively, if information on instructions regarding the display device 100 is received in a pairing process between the remote control 200 and the display device 100, the processor 220 may match the information with each input interface of the remote control 200, e.g., each button included in the remote control 200, and store the information in the memory (not shown).

First, the remote control 200 identifies whether there is a display device having a pairing history. As described above, a pairing process is a process of registering information on each device between each master device and each slave device. Alternatively, it is a process of exchanging profile information on each device between a central device and a peripheral device according to the Bluetooth low energy (BLE) communication method and registering the information, and then exchanging a secret key (a common secret key).

That is, the feature that the remote control 200 identifies whether there is a display device having a pairing history is the same as the feature of determining whether information on a master device or a central device registered through a pairing process within the memory (not shown) exists. Accordingly, the remote control 200 searches information on a master device or a central device stored within the memory (not shown). For example, if the remote control 200 received a hardware address (e.g., a MAC address) regarding a central device from the central device in a pairing process, and registered the address, the processor 220 will search the hardware address stored within the memory (not shown).

Meanwhile, in the memory (not shown) of the remote control 200, information on only one central device may be stored regarding the pairing. That is, if the remote control 200 performed a pairing process with a first display device, and performed a pairing process with another second display device after a Bluetooth connection with the first display device was constituted, the information on the central device stored in the memory (not shown) is renewed from the first display device to the second display device. That is, the information on the first display device is deleted.

Meanwhile, if the processor 220 of the remote control 200 identifies that there is a display device having a pairing history, the processor 220 identifies whether there is a Bluetooth connection with the display device. That is, the processor 220 identifies whether there is a display device 100 connected to the Bluetooth communication module 212 of the remote control 200. In case the Bluetooth communication module 212 is inactivated and the IR communication module is activated, or an IR signal is output through the IR communication module 211, the processor 220 may identify that a Bluetooth connection with the display device 100 was not constituted. Alternatively, in case a "Connection Request" was not received from a specific device (e.g., a central device) during a predetermined time after the processor 220 transmitted an "Advertising Signal" through the Bluetooth communication module 212, the processor 220 may identify that the Bluetooth connection has been cut off. Alternatively, in case exchange of data within a predetermined period was not performed with a display device having a pairing history, i.e., a central device, the processor 220 may identify that a connection with the display device has been cut off. Alternatively, the processor 220 may identify whether there is a Bluetooth connection with the display device 100 by identifying whether the remote control 200 succeeded in synchronizing with frequency hopping generated by the display device 100.

Here, if it is determined that the Bluetooth connection with the display device 100 has been cut off, the processor 220 generates a first identification value. Specifically, if it is identified that a Bluetooth connection with the display device 100 failed, or the Bluetooth connection was stopped, the processor 220 generates the first identification value based on the identification information regarding the display device 100 stored in the memory (not shown).

The first identification value generated as above may be used for the display device 100 to identify whether there is a pairing history with the remote control 200, and verify the subject of an IR signal including the first identification value. Hereinafter, the first identification value performing a trigger role for the display device 100 to identify whether there is a Bluetooth connection between the display device 100 and the remote control 200 will be explained.

According to an embodiment of the disclosure, the processor 220 of the remote control 200 may generate the first identification value based on the identification information of the display device stored in the memory (not shown). For example, it is assumed that the address information of the display device 100 was registered and stored in the memory (not shown) of the remote control 200 in a pairing process. Here, if it is assumed that the value of the MAC address of the display device 100 is [5C:F6:DC:4D:13:D2], the processor 220 sums up byte values constituting the value of the address (the MAC address) of the display device 100. Here, the result of summing up 0X5C, 0XF, 0XDC, 0X45, 0X13, 0XD2 is calculated as 0X360.

Meanwhile, according to an embodiment of the disclosure, the processor 220 may perform a modular process such that the data size of the first identification value coincides with a predetermined data size. For example, if it is assumed that the predetermined data size is 1 Byte, the processor 220 converts the value of 0X360 calculated above such that it becomes 1 Byte, i.e., a value of 8 bit. The processor 220 may convert the result summed up above such that it corresponds to 1 Byte which is the predetermined data size, by deleting "3" which falls under the 100's place in 360. That is the processor 220 converts 0X360 to 0X60. Meanwhile, the processor 220 may calculate a complement of 1 which is a value converted into the predetermined data size. As the binary value of 0X60 is "0110 0000," the complement of 1 would be calculated as "1001 1111." Accordingly, the first identification value generated based on the address (MAC address) information of the display device 100 is ultimately calculated as "1001 1111."

However, the disclosure is not limited thereto, and the first identification value may be generated by various methods. For example, the remote control 200 may generate the first identification value based on time information on a pairing time point between the display device 100 and the remote control 200.

Meanwhile, the display device 100 generates a second identification value by the same method as the method for the remote control 200 to generate the first identification value. In this regard, in a pairing process between the two devices, each device exchanges and stores information on the methods of generating the first identification value and the second identification value of each of them, and accordingly, the identification values of each device may be generated according to the same method. Alternatively, a program or an application may be stored in each device such that the same identification values are generated in a manufacturing process of the display device 100 and the remote control 200.

After generating the first identification value, the processor 220 transmits information on the first identification value to the display device 100 through the communication unit 210. Here, the processor 220 transmits the information on the first identification value through the IR communication module of the communication unit 210. That is, the display device 100 and the remote control 200 transmit and receive the first identification value through IR communication.

Meanwhile, according to an embodiment of the disclosure, the processor 220 transmits an IR signal including both of a control signal corresponding to a control instruction input through the input interface (not shown) of the remote control 200 and the first identification value to the display device 100.

Specifically, if a control instruction is input through the input interface (not shown) of the remote control 200, the processor 220 identifies whether there is a Bluetooth connection with the display device 100. For example, it is assumed that the user manipulated the channel change button of the remote control 200 and input a control instruction for changing the channel. Here, the processor 220 identifies whether there is a Bluetooth connection with the display device 100, and if it is identified that the Bluetooth connection has been cut off, generates the first identification value based on the method described above. Then, the processor 220 transmits an IR signal including a control signal corresponding to the channel change and the first identification value to the display device 100.

For example, if it is assumed that the size of data corresponding to a predetermined channel change is 1 Byte, the processor 220 adds the first identification value of 1 Byte to the last part of the data corresponding to the channel change and generates first data of 2 Byte, and transmits an IR signal including the first data to the display device 100.

Meanwhile, the display device 100 receives the IR signal from the remote control 200 through the IR communication module 111 of the communication unit 110. Here, the processor 130 determines whether the information generated based on the identification information of the display device, i.e., the first identification value is included in the received IR signal. The processor 130 of the display device 100 may determine whether the first identification value is included by comparing the data size value corresponding to the predetermined control construction and the data size value of the received IR signal.

Explaining again based on the aforementioned example, each data corresponding to a control instruction for controlling the display device 100 may be set to have the same size. Here, if an IR signal wherein the first identification value of 1 Byte was added to the data corresponding to the predetermined control instruction is received, the display device 100 may determine that the first identification value is included in the received IR signal.

Meanwhile, the processor 130 identifies whether the remote control 200 that received the IR signal has a history of being paired with the display device based on the identification information of the display device included in the IR signal.

Specifically, the processor 130 may acquire the first identification value from the received IR signal, and generate the second identification value based on the identification information of the display device, and then determine whether the first identification value and the second identification value coincide, and may thereby identify a pairing history between the display device 100 and the remote control 200.

Explaining again based on the aforementioned example, the first identification value is generated based on the address information of the display device 100 stored in the remote control 200. The processor 130 generates the second identification value based on the address information of the display device 100. Then, the processor 130 compares the first identification value and the second identification value, and in case the first identification value and the second identification value coincide, identifies that there is a history of being paired with the remote control 200 that transmitted the IR signal.

In the case of the display device 100 which falls under the master device, a simultaneous Bluetooth connection with a plurality of other slave devices, but not the remote control 200, is possible. For example, a case wherein the display device 100 is simultaneously connected with the remote control 200, a Bluetooth speaker, and Bluetooth earphones, etc. falls under such a case. Accordingly, in case a Bluetooth connection with a plurality of devices was constituted, a cut-off of the Bluetooth connection with the remote control 200 can be identified by identifying only the history of being paired with the remote control 200 based on the first identification value.

Meanwhile, the first identification value and the second identification value are generated respectively in the display device 100 and the remote control 200, based on the same generation method that was predetermined or was set through a pairing process.

If it is identified that the remote control 200 that transmitted an IR signal including the first identification value has a history of being paired with the display device 100, the processor 130 identifies whether there is a Bluetooth connection between the display device 100 and the remote control 200.

Specifically, the processor 130 may identify a cut-off of the Bluetooth connection by identifying whether the remote control 200 which is the slave device was synchronized with frequency hopping generated by the display device 100. Alternatively, if the display device 100 receives an IR signal, the processor 130 may identify that the Bluetooth connection with the remote control 200 has been cut off. Alternatively, in case data exchange within the predetermined period was not performed with the display device 100 having a pairing history, i.e., the central device, the processor 130 may identify that the connection with the display device 100 has been cut off. Alternatively, if the display device 100 receives data based on Bluetooth communication from the remote control 200 and then receives data based on IR communication from the remote control 200 which is the same slave device (or the peripheral device) within a predetermined time, the processor 130 may determine that the Bluetooth connection between each device has been cut off. Alternatively, if the IR communication module 121 is activated within a predetermined time after the Bluetooth communication module 122 included in the communication unit 120 of the display device 100 is activated, the processor 130 may identify that the Bluetooth connection has been cut off.

Figure 6:
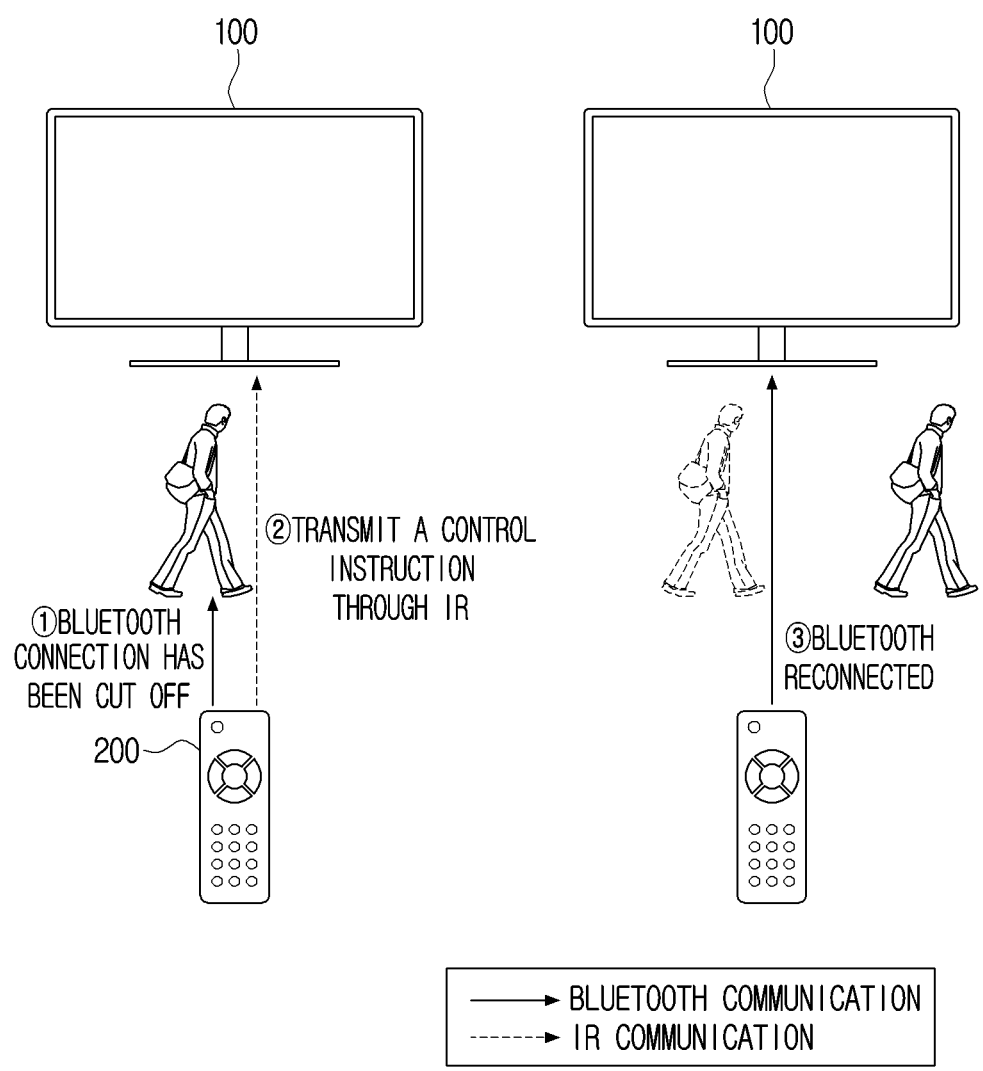
FIG. 6 is a diagram for illustrating an embodiment of counting the number of times that a Bluetooth connection has been cut off according to an embodiment of the disclosure.

FIG. 6 is a diagram for illustrating an embodiment of counting the number of times that a Bluetooth connection has been cut off according to an embodiment of the disclosure.

Meanwhile, according to an embodiment of the disclosure, if it is identified that the Bluetooth connection has been cut off, the display device 100 may count the number of times that the Bluetooth connection with the remote control 200 has been cut off, and determine that the pairing connection between the display device 100 and the remote control 200 has been cut off, based on the counted number of times.

The Bluetooth connection between the display device 100 and the remote control 200 may be cut off by various causes. For example, the Bluetooth connection between the display device 100 and the remote control 200 may be cut off by electric wave interference by a peripheral device. Alternatively, in case priorities have been set regarding a Bluetooth connection in the display device 100, as a Bluetooth connection with another slave device (or peripheral device) falling under a prior order to the remote control 200 is constituted, the Bluetooth connection between the display device 100 and the remote control 200 may be cut off.

Alternatively, as illustrated in FIG. 6, the Bluetooth connection may be cut off as a signal is blocked by an object arranged between the display device 100 and the remote control 200. Alternatively, the Bluetooth connection may be cut off in case the display device 100 is in an off state.

However, even in case the Bluetooth connection is cut off, a pairing process between the display device 100 and the remote control 200 does not have to be necessarily performed for the Bluetooth connection. For example, in case pairing information regarding Bluetooth was deleted according to initialization or update of the display device 100, a pairing process should follow for a Bluetooth connection with the remote control 200 afterwards. However, as in FIG. 6, in case the Bluetooth connection between the display device 100 and the remote control 200 was temporarily cut off by an object arranged between the display device 100 and the remote control 200, the Bluetooth connection between the display device 100 and the remote control 200 may be constituted again after the object is removed. Alternatively, in case the display device 100 converts from an off state to on state, the Bluetooth connection with the remote control 200 may be constituted again after a predetermined time passes. That is, after the processor 130 receives an Advertising Signal again from the remote control 200 through the Bluetooth communication module 122, if hopping is performed in a predetermined channel or a frequency between the display device 100 and the remote control 200, the Bluetooth connection between the two devices may be performed. That is, the Bluetooth connection between the two devices may be constituted again without a pairing process.

In other words, as the profile information stored in the memory (not shown) of each of the display device 100 and the remote control 200 is deleted through a pairing process, in case the Bluetooth connection between the display device 100 and the remote control 200 has been cut off, a pairing process is required again for a Bluetooth connection, but in the case of a temporary cut-off wherein the profile information between the display device 100 and the remote control 200 is maintained, a pairing process is not required for a Bluetooth connection.

Meanwhile, even though the Bluetooth connection between the display device 100 and the remote control 200 was temporarily cut off like this, if a UI requesting pairing is displayed on the display every time, the user has to repeat an unnecessary pairing process.

Accordingly, in an embodiment of the disclosure, the processor 130 counts the number of times that it was identified that a Bluetooth connection has been cut off, and identifies whether a pairing process with the remote control 200 is necessary based on the counted number of times, for correctly providing information on the pairing that the user has to perform to the user.

For this, according to an embodiment of the disclosure, the processor 130 may control the display unit 110 to display a UI for a pairing with the remote control 200, limited to a case wherein the counted number of times is greater than or equal to a predetermined value.

For example, it is assumed that the predetermined value is three times. Also, it is assumed that the Bluetooth connection between the display device 100 and the remote control 200 has been cut off. Here, if a user instruction for controlling the display device 100 (e.g., a user instruction for a channel change) is input through the input interface (not shown) of the remote control 200, the processor 220 of the remote control 200 transmits an IR signal including a control instruction corresponding to the user instruction (e.g., a control instruction for a channel change) and the first identification value to the display device 100. Then, every time the display device 100 receives the IR signal including the first identification value, the processor 130 identifies whether there is a Bluetooth connection, and counts the number of times that it was identified that the Bluetooth connection has been cut off. Here, if the counted number of times is greater than or equal to three times, the processor 130 identifies that the cut-off of the Bluetooth connection with the remote control 200 is not temporary, and determines that a pairing process is necessary. Accordingly, the processor 130 displays a UI for a pairing on the display unit 110.

Meanwhile, if it is assumed that an IR signal includes both of information on a control instruction and information on the first identification value, and a control instruction input by the user is different every time, the display device 100 receives different IR signals every time. However, even in such a case, the first identification value included in the IR signals is the same.

Figure 7:
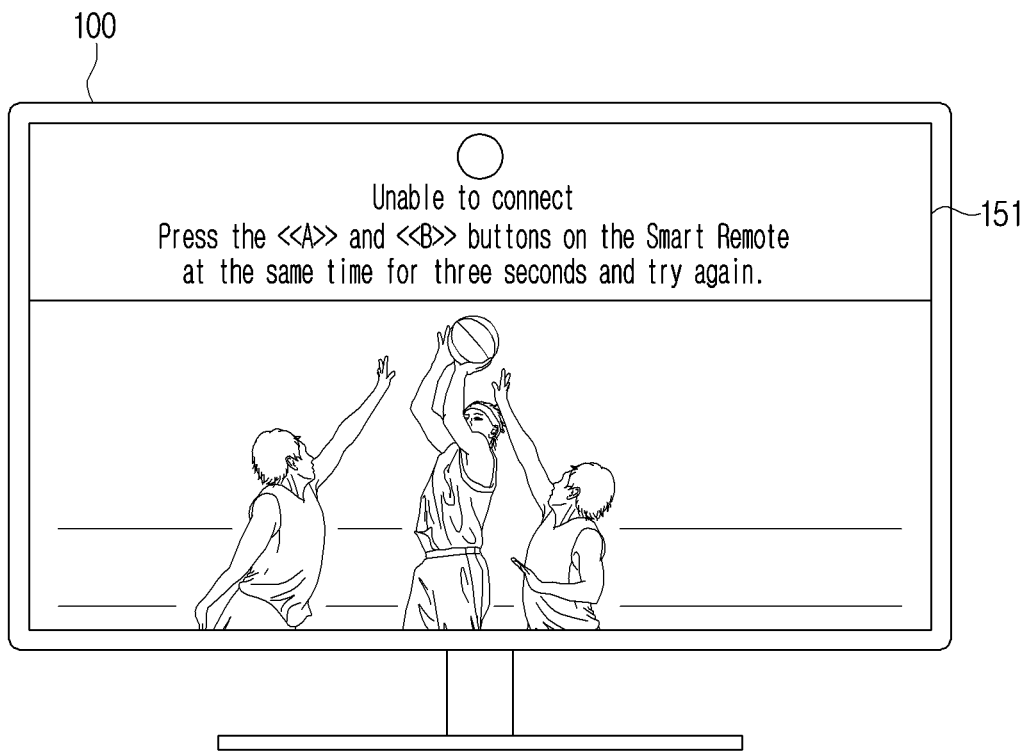
FIG. 7 is an exemplary diagram of a UI for a pairing with a remote controller according to an embodiment of the disclosure.
Figure 8:
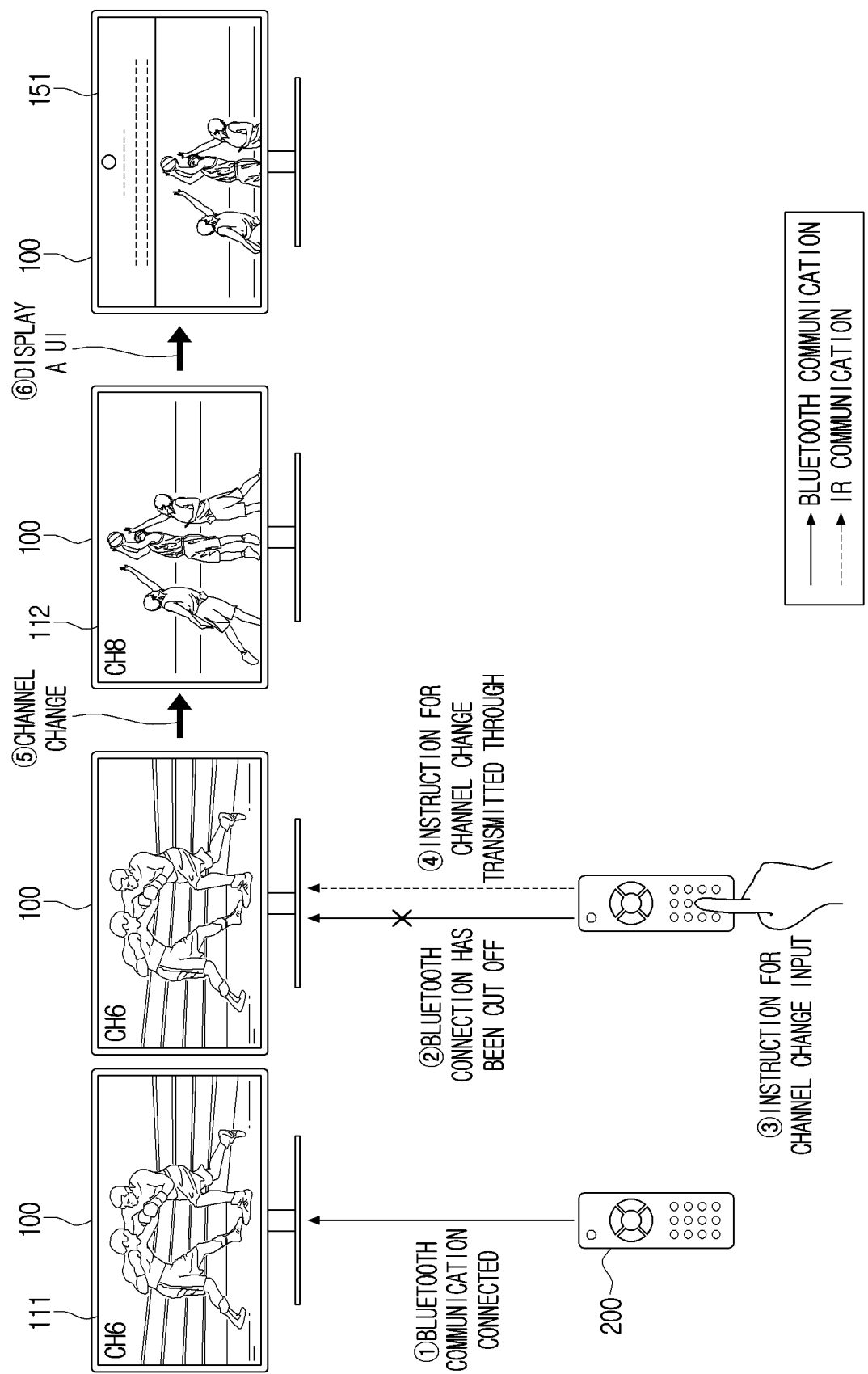
FIG. 8 is a diagram illustrating controlling an operation of a display device based on a control instruction included in an IR signal, and identifying a cut-off of a Bluetooth connection based on identification information of the display device included in the IR signal according to an embodiment of the disclosure.

FIG. 7 is an exemplary diagram of a UI for a pairing with a remote controller according to an embodiment of the disclosure, and FIG. 8 is a diagram illustrating controlling an operation of a display device based on a control instruction included in an IR signal, and identifying a cut-off of a Bluetooth connection based on identification information of the display device included in the IR signal according to an embodiment of the disclosure.

Referring to FIG. 7, if it is identified that a pairing process between the display device 100 and the remote control 200 is needed based on the counted number of times that the Bluetooth connection has been cut off, the processor 130 controls the display unit 110 to display a user interface (UI) for a pairing with the remote control 200.

Here, the UI displayed on the display unit 110 (referred to as a first UI hereinafter) includes information for guiding a user instruction that should be input into the remote control for a pairing. For example, in case an instruction for initiating a pairing process for an "A" button and a "B" button included in the remote control 200 has been set, the processor 130 may display a message requesting input of the "A" button and the "B" button. Also, the UI may include information notifying that the Bluetooth connection between the display device 100 and the remote control 200 has been cut off, and may also include information regarding an input period and an input method (e.g., the "A" button and the "B" button are to be input simultaneously) of a user instruction.

Meanwhile, according to an embodiment of the disclosure, the processor 130 may identify whether the remote control 200 has a history of being paired with the display device 100 based on the first identification value included in an IR signal, and simultaneously control the operation of the display device 100 based on a control signal included in the IR signal.

Referring to FIG. 8, in case the remote control 200 transmitted an IR signal including a control instruction corresponding to an instruction for a channel change and the first identification value, the processor 130 of the display device 100 may be able to control the operation of the display device 100 based on the control instruction, and at the same time, identify whether the Bluetooth connection has been cut off based on the first identification value. Specifically, based on the instruction for a channel change included in the IR signal, the processor 130 changes the screen 111 of the channel currently displayed on the display unit 110 to a screen 112 corresponding to the changed channel, and if it is identified that pairing is needed again based on the first identification value, the processor 130 simultaneously displays information notifying that the Bluetooth connection between the display device 100 and the remote control 200 has been cut off, and a UI including information for guiding a user instruction that should be input into the remote control 200 for a pairing. Through this, the user's control of the display device 100 using the remote control 200 is not interfered, and at the same time, it can be identified whether there is a Bluetooth connection.

Meanwhile, according to an embodiment of the disclosure, if it is identified that a Bluetooth connection between the display device 100 and the remote control 200 has been constituted, the processor 130 may initialize the counted number of times.

Specifically, the processor 130 periodically identifies whether Bluetooth communication has been connected between the display device 100 and the remote control 200. Then, if it is determined that a Bluetooth connection has been constituted between the display device 100 and the remote control 200, the processor 130 initializes the counted number of times to '0.' For example, the processor 130 may identify whether a Bluetooth connection has been constituted between the display device 100 and the remote control 200 pre predetermined time, or identify whether a Bluetooth connection has been constituted between the display device 100 and the remote control 200 in real time. Here, the processor 130 may identify whether a Bluetooth connection has been constituted between the display device 100 and the remote control 200 regardless of whether an IR signal including the first identification value was received from the remote control 200.

Alternatively, the processor 130 may identify whether a Bluetooth connection has been constituted between the display device 100 and the remote control 200 whenever it receives a signal receiving a control instruction from the remote control 200 regardless of the type of the signal (e.g., regardless of a Bluetooth signal or an IR signal).

Explaining again based on the aforementioned example, it is assumed that the predetermined value is three times. Here, if the number of times that it was identified that the Bluetooth connection between the display device 100 and the remote control 200 has been cut off is two times, and if it is identified that a Bluetooth connection between the display device 100 and the remote control 200 has been constituted afterwards, the counted number of times is initialized to 0 time. If the counted number of times of two times is not initialized to 0 time, the number of times that the Bluetooth connection has been cut off is counted as three times afterwards even if the Bluetooth connection with the remote control 200 has been temporarily cut off. Ultimately, even if a pairing process is not needed, a UI guiding a pairing to the user may be displayed, and this leads to a result like providing incorrect information regarding the Bluetooth connection to the user. Accordingly, for preventing such a problem, if it is determined that a Bluetooth connection has been constituted, the processor 130 initializes the counted number of times.

Figure 9:
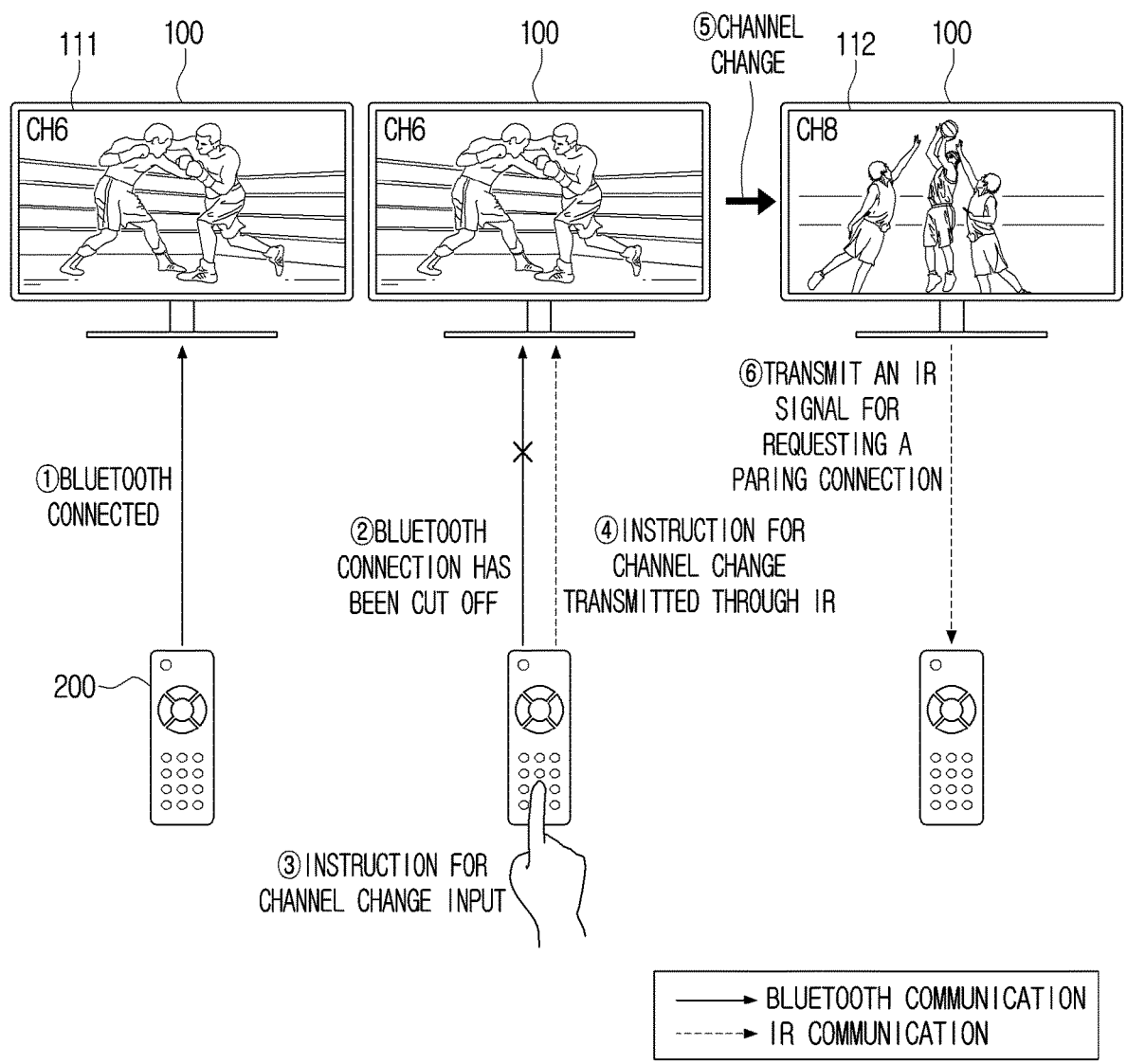
FIG. 9 is an exemplary diagram illustrating transmitting an IR signal requesting a pairing process again from a display device.
Figure 10:
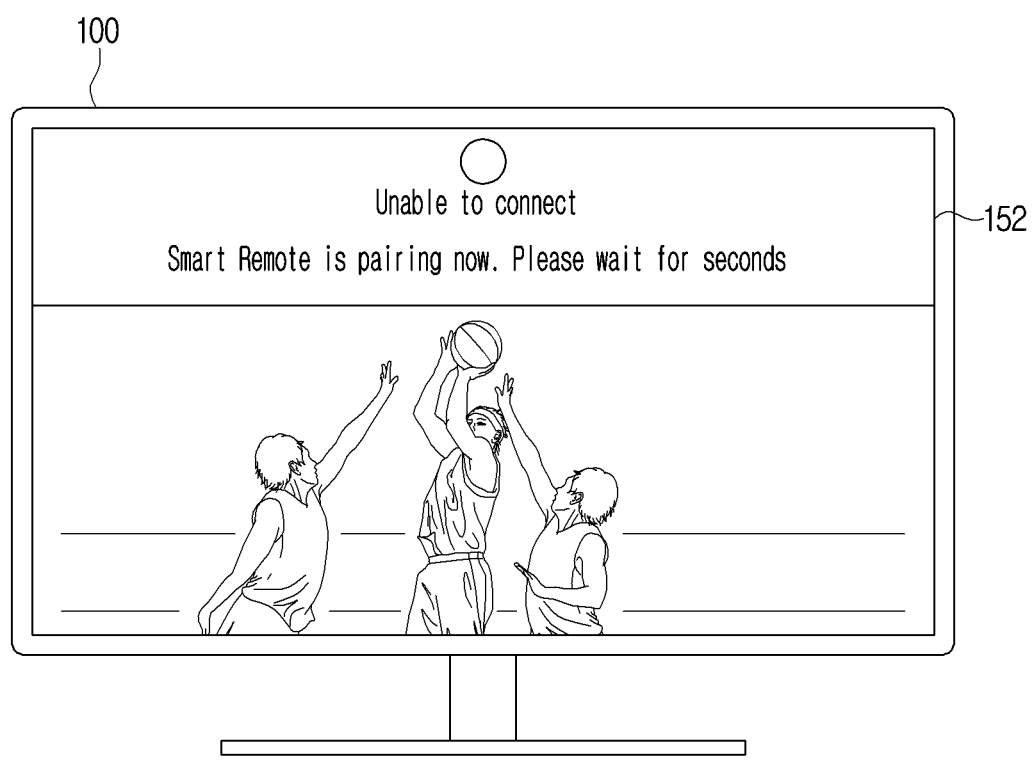
FIG. 10 is an exemplary diagram of a UI indicating that a pairing process is performed based on an IR signal transmitted from a display device.

FIG. 9 is an exemplary diagram illustrating transmitting an IR signal requesting a pairing process from a display device. FIG. 10 is an exemplary diagram of a UI indicating that a pairing process is performed based on an IR signal transmitted from a display device.

Meanwhile, according to an embodiment of the disclosure, if it is identified that a pairing process between the display device 100 and the remote control 200 is required again based on the counted number of times, the processor 130 may transmit an IR signal for requesting a pairing connection with the display device 100 to the remote control 200 through the communication unit 120.

Specifically, referring to FIG. 9, if it is identified that a pairing with the remote control 200 is required again, the processor 130 transmits an IR signal (referred to as a second signal hereinafter) requesting a pairing connection to the remote control 200 through the IR communication module 121. Then, the remote control 200 performs a pairing process based on the received IR signal. For this, the communication unit 210 of the remote control 200 may further include an IR reception unit (not shown).

Meanwhile, the processor 220 of the remote control 200 activates the Bluetooth communication module 212, and exchanges information necessary for a pairing with the display device 100, and performs a pairing process with the display device 100. That is, based on the IR signal received from the display device 100, the display device 100 and the remote control 200 automatically perform a pairing process without the user's manipulation of the remote control 200 that is necessary for a pairing.

In this case, the UI (referred to as a second UI hereinafter) displayed on the display unit 110 of the display device 100 may include information indicating that a pairing with the remote control 200 is being performed.

Referring to FIG. 10, when the display device 100 exchanges information for a pairing with the remote control 200 after receiving the IR signal (the second signal) for requesting a pairing connection, the display device 100 displays the UI (the second Up guiding that the pairing process is proceeding on the display unit 110.

Meanwhile, according to an embodiment of the disclosure, if it is determined that the first identification value and the second identification value do not coincide, the processor 130 may transmit an IR signal for requesting a pairing connection with the display device 100 to the remote control 200, and control the display unit to display a UI including information indicating that a pairing with the remote control 200 is being performed. That is, the feature that the first identification value and the second identification value do not coincide means that there is no pairing history information between the display device 100 and the remote control 200. In this case, the display device 100 may perform a pairing process with the remote control 200 by transmitting the IR signal (the second signal) requesting a pairing connection, such that a Bluetooth connection with the remote control 200 is possible.

Meanwhile, in the aforementioned embodiments, it was explained that the processor 130 identifies whether a pairing between the display device 100 and the remote control 200 is required based on the counted number of times, and in accordance thereto, displays a UI, or transmits an IR signal for requesting a pairing connection with the display device 100 to the remote control 200. However, this is merely an example, and the processor 130 may perform an operation of displaying a UI or transmitting an IR signal to the remote control 200 in case the counted number of times is greater than or equal to the predetermined value based only on the counted number of times, without separately identifying whether a pairing is requested.

Figure 11:
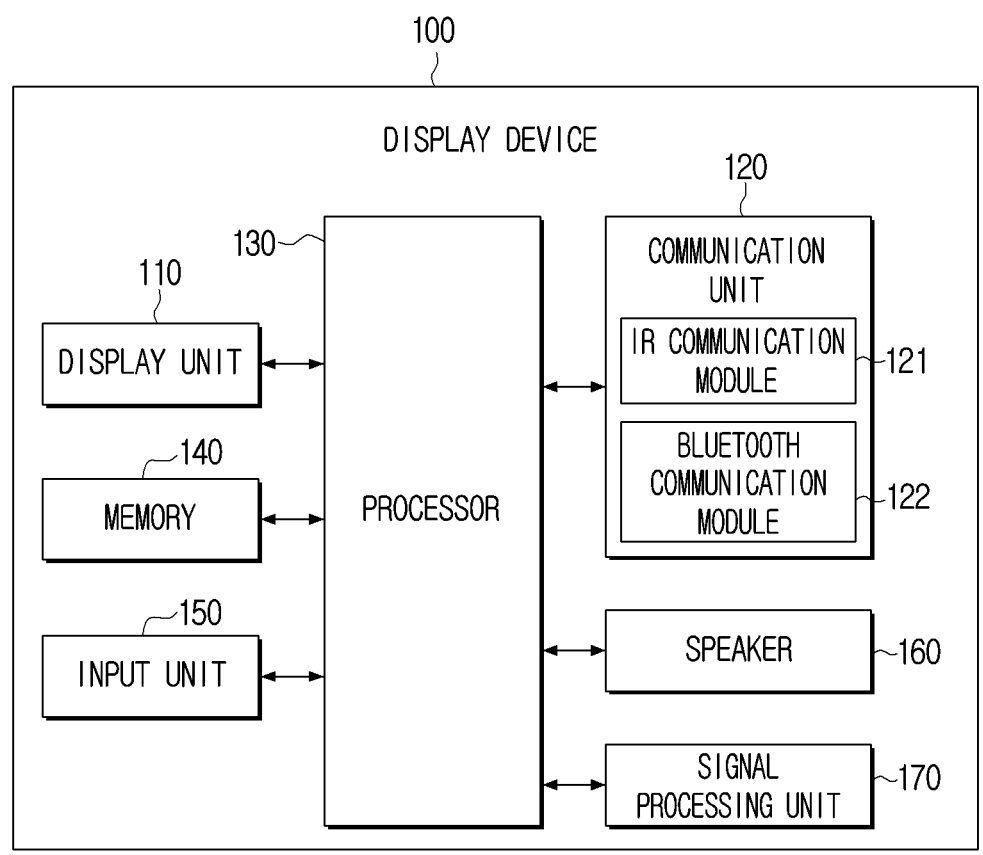
FIG. 11 is a detailed configuration diagram of a display device according to an embodiment of the disclosure.

FIG. 11 is a detailed configuration diagram of a display device according to an embodiment of the disclosure.

Referring to FIG. 11, the display device 100 according to an embodiment of the disclosure may include a display unit 110, a communication unit 120, a memory 140, an input unit 150, a speaker 160, a signal processing unit 170, and a processor 130. Hereinafter, regarding parts overlapping with the aforementioned explanation, explanation will be omitted or abridged.

The communication unit 120 may receive a signal regarding a control instruction from the remote control 200 through the IR communication module 121 and the Bluetooth communication module 122, as explained above. Here, an IR signal received by the communication unit 120 may include a first identification value used for identifying a history of being paired. Meanwhile, the processor 130 may transmit an IR signal for requesting a pairing connection with the display device 100 to the remote control 200 through an IR transmission module (not shown). As detailed explanation in this regard was described above, explanation will be omitted.

Meanwhile, the communication unit 120 may perform communication with an external device, and receive a broadcasting content (or, a broadcasting signal). Here, the broadcasting content may include at least one of a video, audio, or additional data (e.g., EPG). For this, although not illustrated clearly in the drawings, the communication unit 220 may include a tuner (not shown), a demodulator (not shown), an equalizer (not shown), etc.

The memory 140 may store information supporting various functions of the display device 100. For example, the memory 140 may store driving programs and a plurality of applications (application programs) of the display device 100, or data and instructions used in them. At least some of the applications may be downloaded from an external server (not shown) through wireless communication. Also, at least some of the applications may exist for basic functions according to the characteristics of the display device 100. Meanwhile, the applications may be stored in the memory 140, and may be driven to perform the operations (or functions) of the display device 100 by the processor 130.

In particular, in the memory 140, profile information of the remote control 200 (e.g., the MAC address of the remote control 200) exchanged through a pairing process with the remote control 200 may be stored. Not only that, the profile information of the display device 100 may also be stored. Here, when the processor 130 receives an IR signal including the first identification value from the remote control 200, the processor 130 acquires the identification information or the profile information of the display device 100 stored in the memory 140 and generates a second identification value, and then determines whether the first identification value and the second identification value coincide. Then, in case the first identification value and the second identification value coincide, the processor 130 may identify that there is a pairing history between the display device 100 and the remote control 200.

The input unit 150 may receive inputs of various user instructions. The processor 130 may execute a function corresponding to a user instruction input through the input unit 150. For this, the input unit 150 may be implemented as an input panel. The input panel may be implemented as a touch pad type, or a key pad type including various kinds of function keys, number keys, special keys, character keys, etc., or a touch screen type.

The speaker 160 may output various kinds of audio. For example, the speaker 160 may output audio regarding a video output through the display unit 110.

The signal processing unit 170 performs signal processing for a content received through the communication unit 120. Specifically, the signal processing unit 170 may perform operations such as decoding, scaling, and frame rate conversion, etc. for a video constituting a content, and process the video as a signal in a form that can be output from the display device 100. Also, the signal processing unit 170 may perform signal processing such as decoding, etc. for audio constituting a content, and process the audio as a signal in a form that can be output from the speaker 160. Accordingly, the display 100 can display a video, etc. output from the signal processing unit 170, and the speaker 160 can output audio output from the signal processing unit 170.

Figure 12:
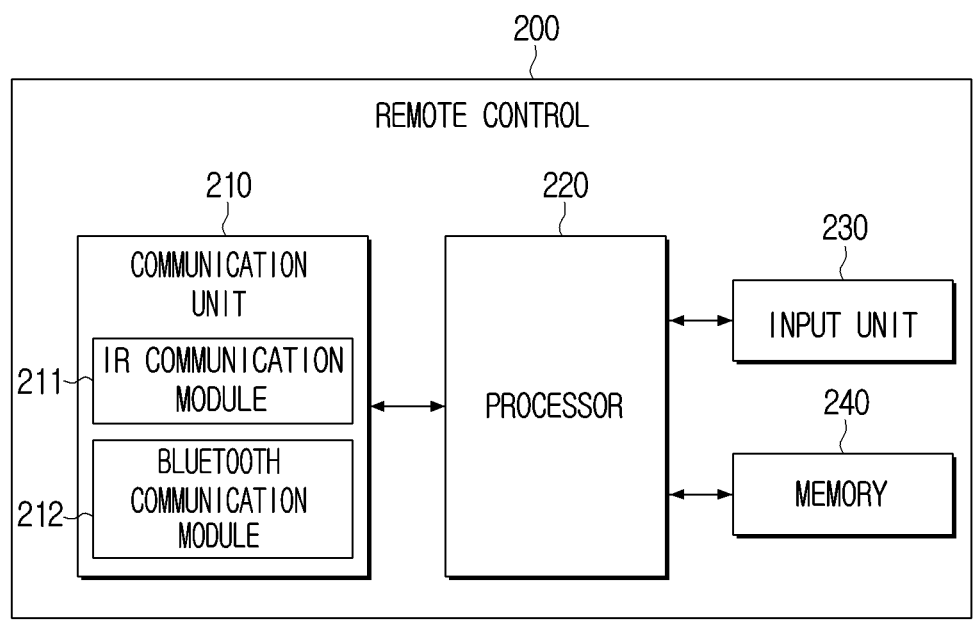
FIG. 12 is a detailed configuration diagram of a remote controller according to an embodiment of the disclosure.

FIG. 12 is a detailed configuration diagram of a remote controller according to an embodiment of the disclosure.

Referring to FIG. 12, the remote control 200 according to an embodiment of the disclosure may include a communication unit 210, an input unit 230, a memory 240, and a processor 220. Hereinafter, regarding parts overlapping with the aforementioned explanation, explanation will be omitted or abridged.

The remote control 200 may transmit an IR signal or a Bluetooth signal including a control instruction to the display device 100 through the communication unit 210. For this, the communication unit 210 includes an IR communication module 211 and a Bluetooth communication module 212. As explanation in this regard was described above, detailed explanation will be omitted.

The input unit 230 may include an input interface implemented in a form of including an input interface button unit, a touch pad, etc. explained above. The remote control 200 receives an input of a control instruction for controlling the operation of the display device 100 from the user through the input unit 230. For example, the input unit 230 may include a power button unit receiving inputs of user instructions for power ON/OFF, a channel change unit for a channel change, a volume adjustment unit for volume adjustment, etc. Also, the power button unit, the channel change unit, and the volume adjustment unit, etc. may be constituted as each button of the remote control, and to each remote control button, a corresponding control code may be allotted.

In the memory 240, the identification information or the profile information of the display device 100 received from the display device 100 through a pairing process with the display device 100 may be stored. That is, if it is identified that the Bluetooth connection between the remote control 200 and the display device 100 has been cut off, the processor 220 may acquire the identification information of the display device 100 (e.g., the MAC address) stored in the memory 240 through a pairing process, and generate the first identification value. As detailed explanation in this regard was described above, explanation will be omitted.

Also, in the memory 240, information supporting various functions of the remote control 200 may be stored. Specifically, in the memory 240, a control code set for controlling the display device 100 may be stored. For example, in the memory 240, control instruction information regarding the display device 100 interlocked with the remote control 200 may be matched with the buttons included in the input unit 230 of the remote control 200, and stored. Meanwhile, the control instruction information may be received through a pairing process with the display device 100 and stored, or it may be received from an external server and an external device through the communication unit 210, and stored in the memory 240.

Hereinafter, a control method of a display device according to an embodiment of the disclosure will be described with reference to FIG. 13 to FIG. 17, and a control method of a remote control will be described with reference to FIG. 18.

Figure 13:
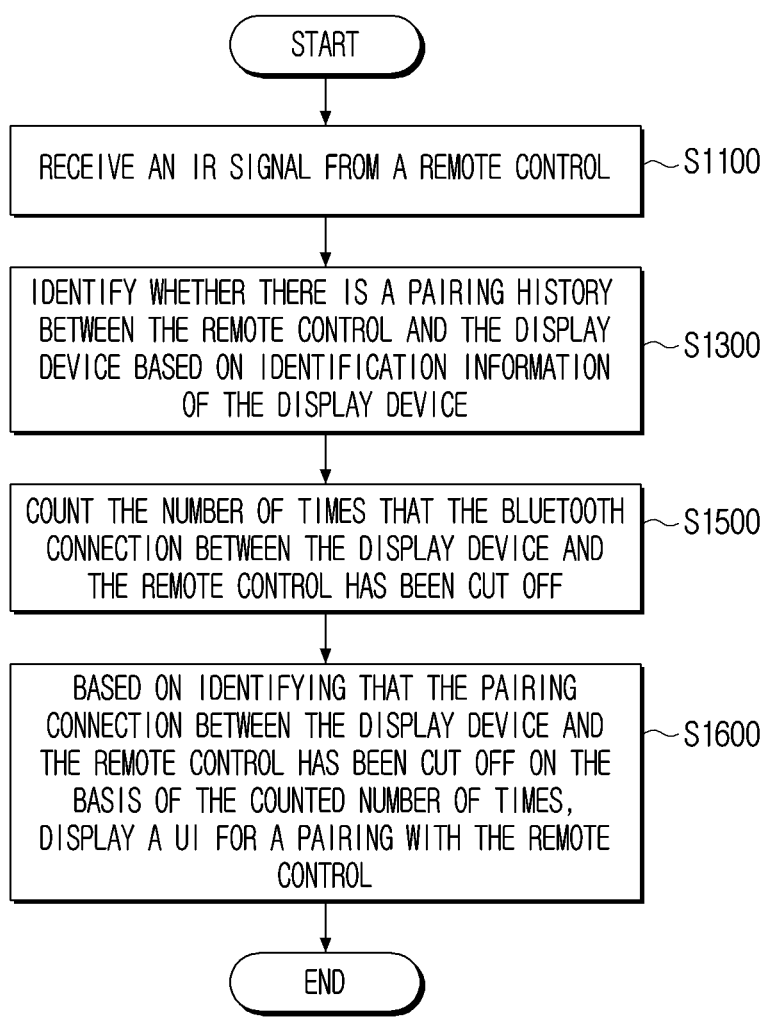
FIG. 13 is a schematic sequence diagram regarding a control method of a display device according to an embodiment of the disclosure.

FIG. 13 is a schematic sequence diagram regarding a control method of a display device according to an embodiment of the disclosure.

Referring to FIG. 13, according to an embodiment of the disclosure, the display device 100 receives an IR signal from a smart remote control 200 in operation S1100.

Then, if it is determined that information generated based on identification information of the display device 100 is included in the IR signal, a pairing history between the remote control and the display device 100 is identified based on the identification information of the display device 100 in operation S1300.

Then, if there is a pairing history between the display device 100 and the remote control 200, the number of times that the Bluetooth connection between the display device 100 and the remote control 200 has been cut off is counted in operation S1400. For example, the number of times that the Bluetooth connection between the display device 100 and the remote control 200 has been cut off during a predetermined period may be counted.

Then, if it is identified that a pairing connection between the display device 100 and the remote control 200 is needed based on the counted number of times, the display unit is controlled to display a UI for a pairing with the remote control in operation S1600.

Figure 14:
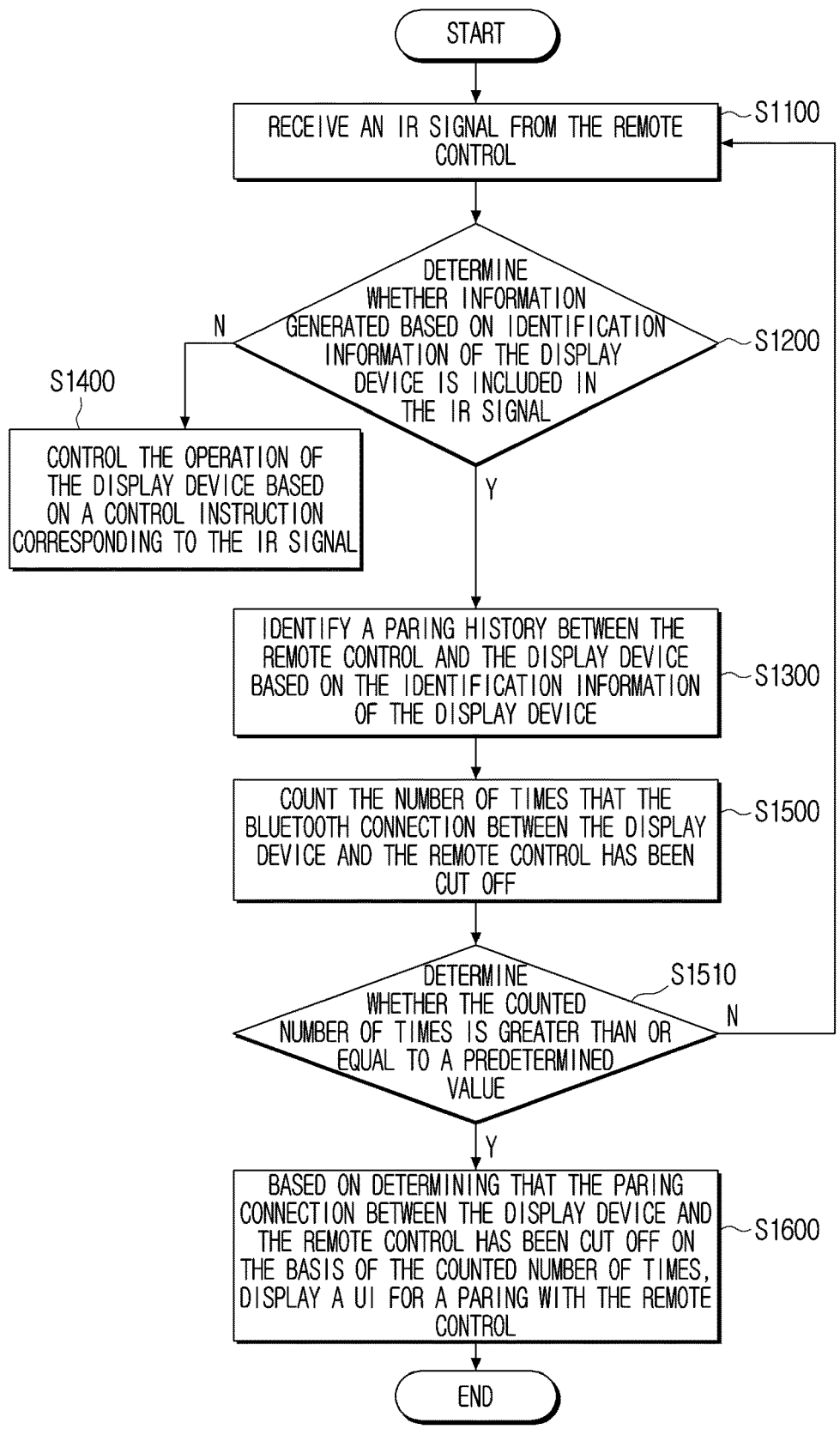
FIG. 14 is a schematic sequence diagram regarding a control method of a display device based on the counted number of times that a Bluetooth connection has been cut off according to an embodiment of the disclosure.

FIG. 14 is a schematic sequence diagram regarding a control method of a display device based on the counted number of times that a Bluetooth connection has been cut off according to an embodiment of the disclosure.

Meanwhile, referring to FIG. 14, according to an embodiment of the disclosure, the aforementioned control method of a display device may further include an operation S1200 of determining whether information generated based on identification information of the display device 100 is included in an IR signal. Here, if it is identified that information generated based on identification information of the display device 100 is not included in the IR signal, the processor 130 controls the operation of the display device 100 based on a control instruction corresponding to the IR signal.

Meanwhile, according to an embodiment of the disclosure, the processor 130 may determine whether the counted number of times that the Bluetooth connection has been cut off is greater than or equal to a predetermined value in operation S1510, and display a UI for a pairing with the remote control limited to a case wherein the counted number of times that the Bluetooth connection has been cut off is greater than or equal to the predetermined value in operation S1600. This is for distinguishing a case wherein the Bluetooth connection has been temporarily cut off, as explained above. That is, this is for preventing the user from performing an unnecessary pairing as a UI is displayed although the Bluetooth connection would be constituted again after a predetermined time passes.

Meanwhile, if the counted number of times is smaller than the predetermined value, the processor 130 may count the number of times that the Bluetooth connection has been cut off based on another IR signal received from the remote control 200.

Figure 15:
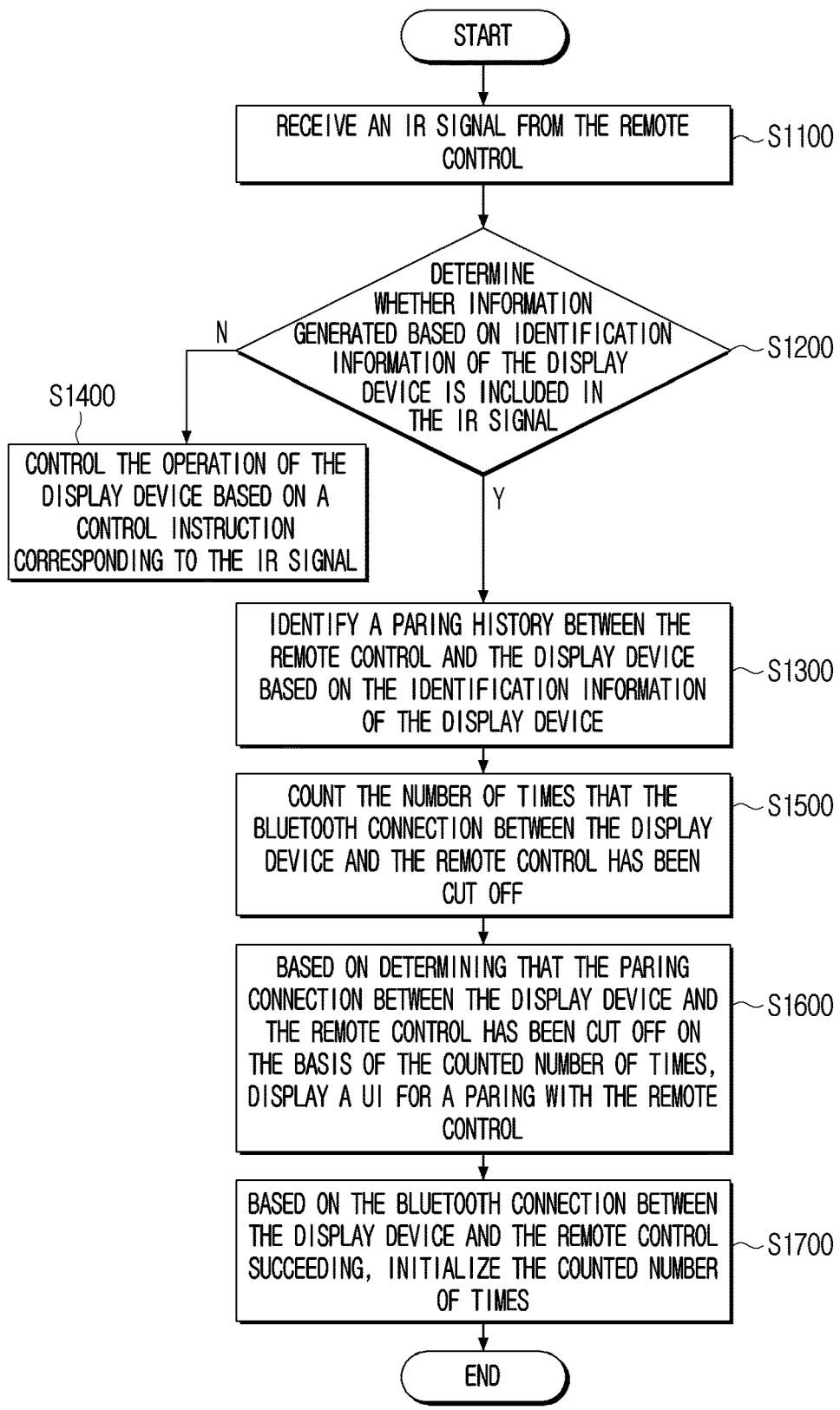
FIG. 15 is a schematic sequence diagram regarding a method of controlling a display device by counting the number of times that a Bluetooth connection has been cut off according to an embodiment of the disclosure.

FIG. 15 is a schematic sequence diagram regarding a method of controlling a display device by counting the number of times that a Bluetooth connection has been cut off according to an embodiment of the disclosure.

Meanwhile, referring to FIG. 15, according to an embodiment of the disclosure, the processor 130 periodically identifies whether there is a Bluetooth connection between the display device 100 and the remote control 200, and if it identified that a Bluetooth connection has been constituted between the display device 100 and the remote control 200, initializes the counted number of times in operation S1700.

Figure 16:
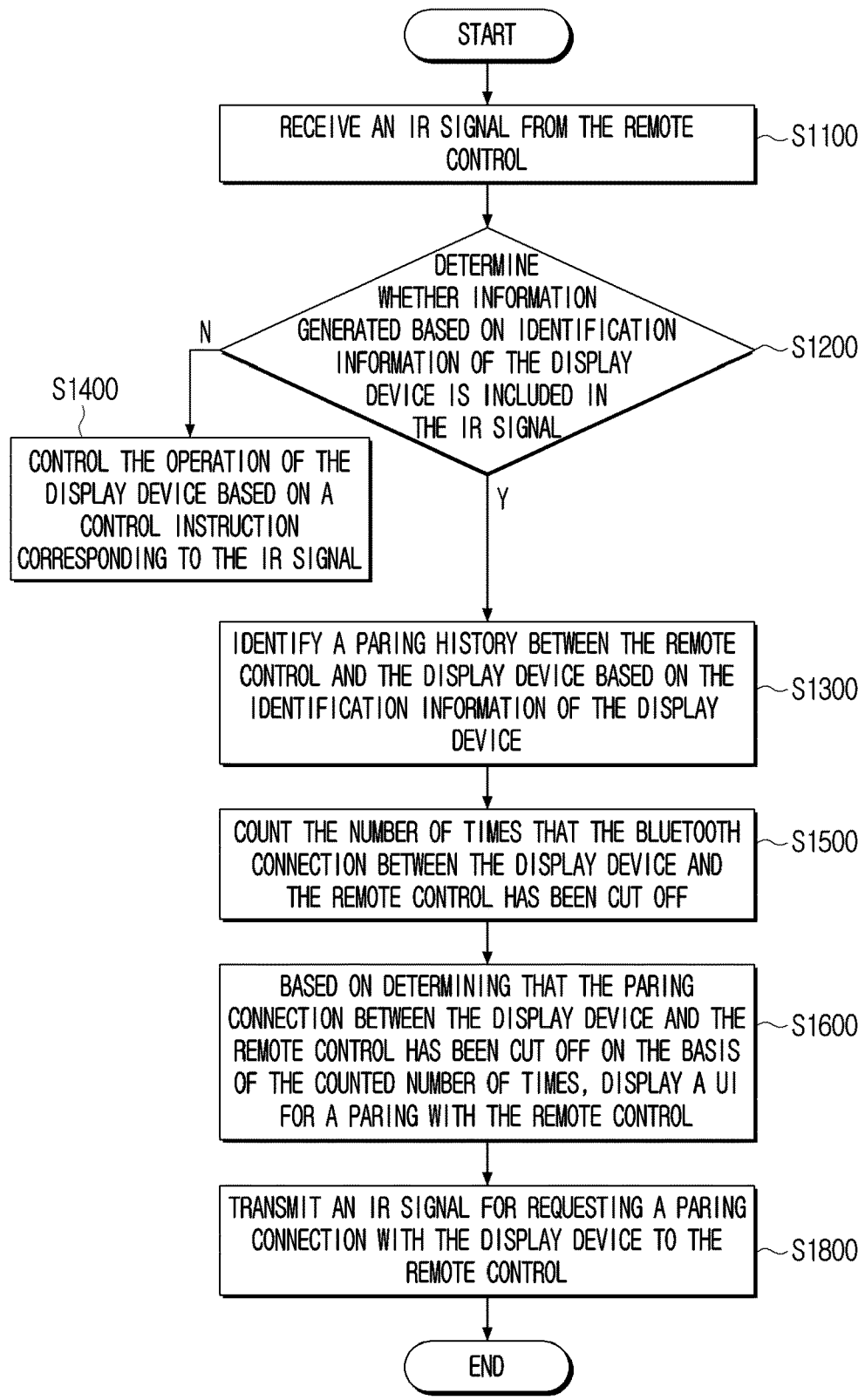
FIG. 16 is a schematic sequence diagram regarding a method of identifying a pairing history between a remote controller and a display device according to an embodiment of the disclosure.

FIG. 16 is a schematic sequence diagram regarding a method of identifying a pairing history between a remote controller and a display device according to an embodiment of the disclosure.

Also, referring to FIG. 16, according to an embodiment of the disclosure, the processor 130 may transmit an IR signal for requesting a pairing connection with the display device 100 to the remote control 200 through the IR communication module 121 of the communication unit 120 in operation S1800. Through this, a pairing process between the display device 100 and the remote control 200 automatically proceeds without the user's manipulation of the remote control 200.

Figure 17:
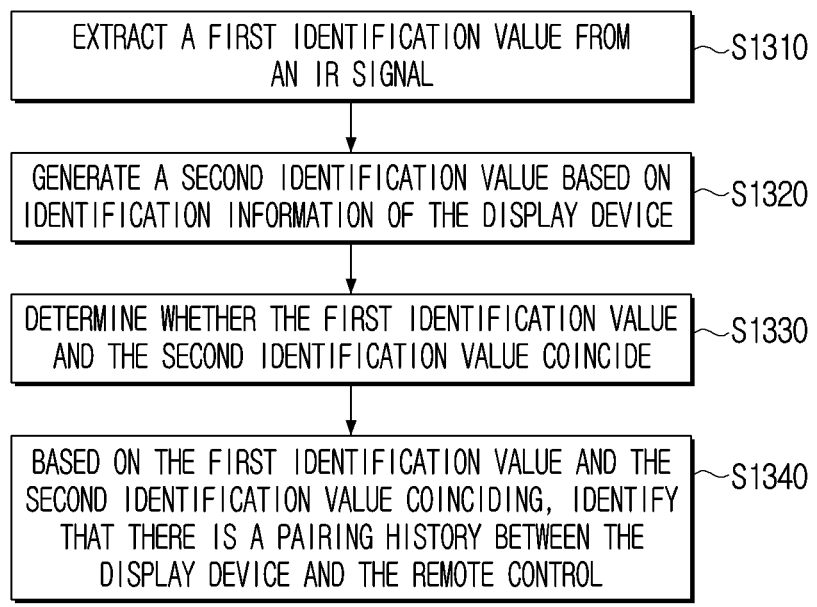
FIG. 17 is a schematic sequence diagram regarding a method of identifying a pairing history between a remote controller and a display device according to an embodiment of the disclosure.

FIG. 17 is a schematic sequence diagram regarding a method of identifying a pairing history between a remote controller and a display device according to an embodiment of the disclosure.

Meanwhile, referring to FIG. 17, according to an embodiment of the disclosure, the processor 130 may acquire a first identification value from an IR signal in operation S1310, generate a second identification value based on identification information of the display device 100 (e.g., the MAC address) in operation S1320, determine whether the first identification value and the second identification value coincide in operation S1330, and identify that there is a pairing history between the display device 100 and the remote control 200 limited to a case wherein the first identification value and the second identification value coincide in operation S1340. In this regard, explanation was described above with respect to identification of a pairing history of the display device 100, and thus detailed explanation will be omitted.

Figure 18:
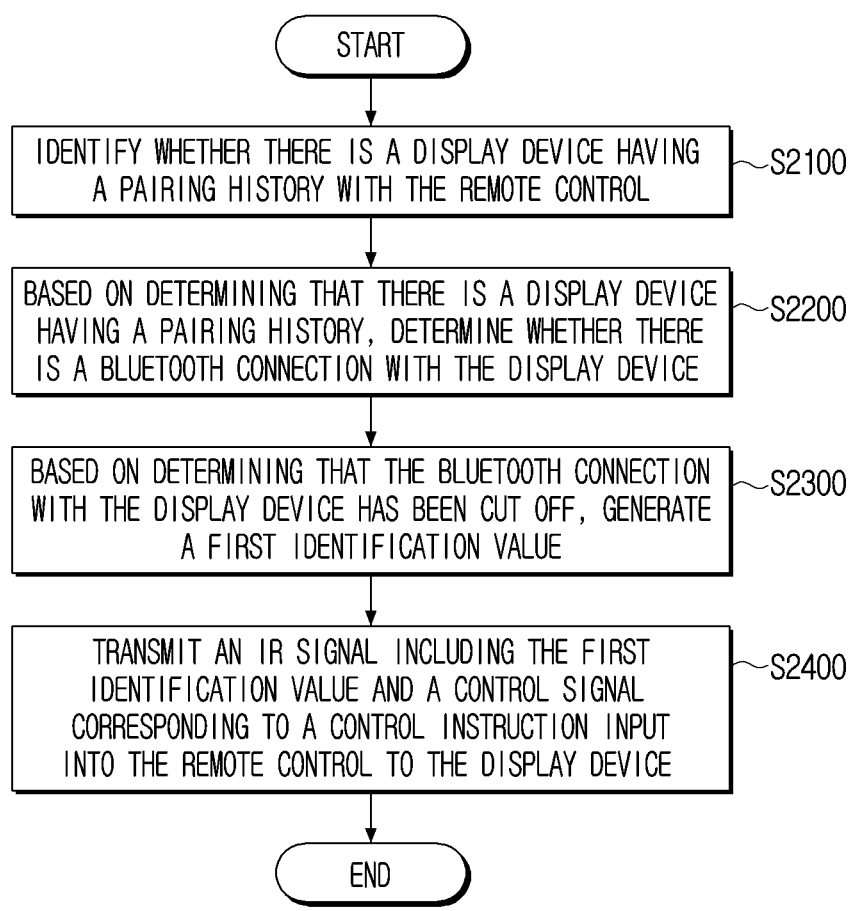
FIG. 18 is a schematic sequence diagram regarding a method of generating a first identification value of a remote controller according to an embodiment of the disclosure.

FIG. 18 is a schematic sequence diagram regarding a method of generating a first identification value of a remote controller according to an embodiment of the disclosure.

Meanwhile, referring to FIG. 18, according to an embodiment of the disclosure, the processor 220 of the remote control 200 may identify whether there is a display device 100 having a pairing history in operation S2100, and if it is identified that there is the display device 100 having a pairing history, determine whether there is a Bluetooth connection with the display device 100 in operation S2200, and if it is determined that the Bluetooth connection with the display device 100 has been cut off, generate a first identification value in operation S2300, and transmit an IR signal including the first identification value and a control signal corresponding to a control instruction input into the remote control to the display device 100 in operation S2400.

Meanwhile, in the aforementioned explanation, the operations S1100 to S2400 may be further divided into additional steps, or combined into fewer steps depending on the implementation examples of the disclosure. Also, some steps may be omitted, or the order of each step may be changed depending on needs. Further, the aforementioned contents regarding the display device and the remote control in FIG. 1 to FIG. 12 can be applied to the display control method in FIG. 13 to FIG. 18, including other omitted contents.

Meanwhile, according to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include a device according to the embodiments disclosed herein. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium is a tangible device, and does not include signals (e.g.: electromagnetic waves), and the term does not distinguish a case wherein data is stored in the storage medium semi-permanently and a case wherein data is stored in the storage medium temporarily. For example, 'a non-transitory storage medium' may include a buffer wherein data is temporarily stored.

Also, according to an embodiment of the disclosure, methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly on-line (e.g.: download or upload) through an application store (e.g.: Play Store™), or between two user devices (e.g.: smartphones). In the case of on-line distribution, at least a portion of a computer program product (e.g.: a downloadable app) may be stored in a storage medium readable by machines such as the server of the manufacturer, the server of the application store, and the memory of the relay server at least temporarily, or may be generated temporarily.

In addition, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:
1. A display device comprising:
a display unit;

a communication unit; and
a processor configured to:
receive an InfraRed (IR) signal from a remote controller through the communication unit, the IR signal including identification information of the display device;
identify whether there is a pairing history of a pairing the remote controller with the display device based on the identification information;
based on the identifying that there is the pairing history, identify whether the pairing was made using a Bluetooth connection; and
count a number of times that the pairing using the Bluetooth connection had been cut off based on the pairing history; and
based on identifying that the pairing between the display device and the remote controller is required based on the counted number of times, control the display unit to display a user interface (UI) to pair with the remote controller.

2. The display device of claim 1,
wherein the UI comprises:
information to guide a user instruction that needs to be input into the remote controller to pair with the remote controller, and
the processor is further configured to:
based on the counted number of times being greater than or equal to a predetermined number, control the display unit to display the UI for the pairing with the remote controller.

3. The display device of claim 1,
wherein the processor is configured to:
acquire a first identification value generated by the remote controller based on the pairing history;
generate a second identification value based on the identification information of the display device; and
identify whether the first identification value and the second identification value coincide to identify the pairing history of the pairing between the display device and the remote controller.

4. The display device of claim 2,
wherein the processor is configured to:
periodically identify whether there is the Bluetooth connection between the display device and the remote controller; and
based on the identifying that there is the Bluetooth connection between the display device and the remote controller, initialize the counted number of times.

5. The display device of claim 4,
wherein the UI further comprises:
information indicating that pairing with the remote controller is being performed, and
the processor is further configured to:
based on the identifying that the pairing connection between the display device and the remote controller had been cut off based on the counted number of times, transmit an IR signal to request a pairing connection with the display device to the remote controller through the communication unit.

6. The display device of claim 3,
wherein the processor is configured to:
based on the identifying that the first identification value and the second identification value do not coincide, transmit an IR signal to request a pairing connection with the display device to the remote controller; and
control the display unit to display a UI including information indicating that pairing with the remote controller is being performed.

7. The display device of claim 3,
wherein the remote controller is configured to:
identify whether there is the display device having the pairing history with the remote controller; and
based on the identifying that there is the display device having the pairing history with the remote controller, identify whether there is the Bluetooth connection with the display device, and based on the identifying that the Bluetooth connection with the display device had been cut off, generate the first identification value, and transmit the IR signal including the first identification value and a control signal corresponding to a control instruction input into the remote controller to the display device.

8. The display device of claim 7,
wherein the processor is configured to:
identify whether the remote controller has the pairing history with the display device based on the first identification value; and
control an operation of the display device based on the control signal.

9. A control method of a display device, the method comprising:
receiving an IR signal including identification information of the display device, from a remote controller;
identifying whether there is a pairing history of a pairing of the remote controller with the display device based on the identification information of the display device;
based on the identifying that there is the pairing history of the pairing of the remote controller and the display device, identifying whether is the pairing was made using a Bluetooth connection;
counting a number of times that the Bluetooth connection between the display device and the remote controller had been cut off based on the pairing history; and
based on the identifying that the pairing between the display device and the remote controller is required based on the counted number of times that the Bluetooth connection has been cut off, displaying a user interface (UI) to pair with the remote controller.

10. The control method of claim 9,
wherein the UI further comprises:
information to guide a user instruction that needs to be input into the remote controller to pair with the remote controller, and
the displaying the UI comprises:
based on the counted number of times being greater than or equal to a predetermined number, displaying the UI for a pairing with the remote controller.

11. The control method of claim 9,
wherein the identifying whether there is the pairing history of being paired comprises:
acquiring a first identification value generated based on the identified pairing history;
generating a second identification value based on the identification information of the display device; and
identifying whether the first identification value and the second identification value coincide to identify the pairing history of the pairing between the display device and the remote controller.

12. The control method of claim 10,
wherein the identifying whether there is the Bluetooth connection comprises:

periodically identifying whether there is the Bluetooth connection between the display device and the remote controller; and based on the identifying that there is the Bluetooth connection between the display device and the remote controller, initializing the counted number of times.

13. The control method of claim 12,
wherein the UI further comprises:
information indicating that pairing with the remote controller is being performed, and
the control method further comprises:
based on the identifying that the pairing connection between the display device and the remote controller had been cut off based on the counted number of times that the Bluetooth connection had been cut off, transmitting the IR signal to request a pairing connection with the display device to the remote controller.

14. The control method of claim 11, further comprising:
based on the identifying that the first identification value and the second identification value do not coincide, transmitting the IR signal to request a pairing connection with the display device to the remote controller; and
displaying the UI comprising information indicating that pairing with the remote controller is being performed.

15. The control method of claim 11,
wherein the remote controller is configured to:
identify whether there is the display device having the pairing history; and
based on the identifying that there is the display device having the pairing history of the pairing with the remote controller, identify whether there is the Bluetooth connection with the display device, and based on the identifying that the Bluetooth connection with the display device had been cut off, generate the first identification value, and transmit the IR signal including the first identification value and a control signal corresponding to a control instruction input into the remote controller to the display device.

16. A non-transitory computer readable recording medium including a program executes a controlling method of a display device, the method comprising:
receiving an IR signal including identification information of the display device, from a remote controller;
identifying whether there is a pairing history of a pairing of the remote controller with the display device based on the identification information of the display device;
based on the identifying that there is the pairing history of the pairing of the remote controller and the display device, identifying whether is the pairing was made using a Bluetooth connection;
counting a number of times that the Bluetooth connection between the display device and the remote controller had been cut off based on the pairing history; and
based on the identifying that the pairing between the display device and the remote controller is required based on the counted number of times that the Bluetooth connection has been cut off, displaying a user interface (UI) to pair with the remote controller.

17. The computer readable recording medium of claim 16,
wherein the UI further comprises:
information to guide a user instruction that needs to be input into the remote controller to pair with the remote controller, and
the displaying the UI comprises:
based on the counted number of times being greater than or equal to a predetermined number, displaying the UI for a pairing with the remote controller.

18. The computer readable recording medium of claim 16,
wherein the identifying whether there is the pairing history of being paired comprises:
acquiring a first identification value generated based on the identified pairing history;
generating a second identification value based on the identification information of the display device; and
identifying whether the first identification value and the second identification value coincide to identify the pairing history of the pairing between the display device and the remote controller.

19. The computer readable recording medium of claim 16,
wherein the identifying whether there is the Bluetooth connection comprises:
periodically identifying whether there is the Bluetooth connection between the display device and the remote controller; and
based on the identifying that there is the Bluetooth connection between the display device and the remote controller, initializing the counted number of times.

20. The computer readable recording medium of claim 19,
wherein the UI further comprises:
information indicating that pairing with the remote controller is being performed, and
the control method further comprises:
based on the identifying that the pairing connection between the display device and the remote controller had been cut off based on the counted number of times that the Bluetooth connection had been cut off, transmitting the IR signal to request a pairing connection with the display device to the remote controller.

* * * * *